US012802848B2

(12) United States Patent
Hagiwara

(10) Patent No.: US 12,802,848 B2
(45) Date of Patent: Nov. 17, 2026

(54) COIL COMPONENT INCLUDING MAGNETIC BASE BODY, AND METHOD OF MANUFACTURING MAGNETIC BASE BODY

(71) Applicant: TAIYO YUDEN CO., LTD., Tokyo (JP)

(72) Inventor: Tomoya Hagiwara, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 765 days.

(21) Appl. No.: 18/323,129

(22) Filed: May 24, 2023

(65) Prior Publication Data

US 2023/0386712 A1 Nov. 30, 2023

(30) Foreign Application Priority Data

May 31, 2022 (JP) ................................ 2022-088794

(51) Int. Cl.

| | |
|---|---|
| ***H01F 27/255*** | (2006.01) |
| ***H01F 1/147*** | (2006.01) |
| ***H01F 1/24*** | (2006.01) |
| ***H01F 41/02*** | (2006.01) |

(52) U.S. Cl.

CPC ........... *H01F 1/24* (2013.01); *H01F 1/14766* (2013.01); *H01F 27/255* (2013.01); *H01F 41/0246* (2013.01)

(58) Field of Classification Search

CPC ...... H01F 1/24; H01F 1/14766; H01F 27/255; H01F 41/0246; H01F 2027/2809; H01F 27/2804; H01F 1/33; H01F 1/26

USPC ................ 336/65, 83, 90, 96, 200, 232–233

See application file for complete search history.

(56) References Cited

U.S. PATENT DOCUMENTS

| | | | |
|---|---|---|---|
| 2012/0274437 A1 | 11/2012 | Matsuura et al. | |
| 2014/0049348 A1 | 2/2014 | Matsuura et al. | |
| 2014/0139311 A1 | 5/2014 | Matsuura et al. | |
| 2016/0163448 A1 | 6/2016 | Matsuura et al. | |
| 2016/0254082 A1* | 9/2016 | Tanada | C22C 38/002 420/78 |
| 2017/0287605 A1* | 10/2017 | Tanada | H01F 1/28 |
| 2020/0312522 A1* | 10/2020 | Kurahashi | H01F 1/14791 |

(Continued)

FOREIGN PATENT DOCUMENTS

| | | |
|---|---|---|
| JP | 2012-238842 A | 12/2012 |
| JP | 2013-046055 A | 3/2013 |
| WO | 2018/180659 A1 | 10/2018 |

*Primary Examiner* — Tuyen T Nguyen

(74) *Attorney, Agent, or Firm* — CUSHMAN PARTNERS LLC

(57) ABSTRACT

A coil component includes: a magnetic base body including a plurality of soft magnetic metal particles that contain Fe and Si, and an oxide film provided on the surface of each of the plurality of soft magnetic metal particles; and a coil conductor provided in the magnetic base body. The oxide film contains an oxide of Si and an oxide of element A (wherein the element A is at least one selected from the group consisting of Cr and Al). Each soft magnetic metal particle is divided into a central region and a surface region radially outward of the central region. The surface region contains a higher atomic proportion of Si than the central region. The soft magnetic metal particles include first soft magnetic metal particles that include Si—O precipitates separated from each other in the surface region.

19 Claims, 11 Drawing Sheets

(56) References Cited

U.S. PATENT DOCUMENTS

| | | | |
|---|---|---|---|
| 2020/0316683 | A1 | 10/2020 | Takahashi |
| 2022/0324018 | A1 | 10/2022 | Takahashi |

* cited by examiner

COIL COMPONENT INCLUDING MAGNETIC BASE BODY, AND METHOD OF MANUFACTURING MAGNETIC BASE BODY

CROSS-REFERENCE TO RELATED APPLICATIONS

This application is based on and claims the benefit of priority from Japanese Patent Application Serial No. 2022-88794 (filed on May 31, 2022), the contents of which are hereby incorporated by reference in its entirety.

TECHNICAL FIELD

The present disclosure relates to a coil component including a magnetic base body, and a method of manufacturing the magnetic base body.

BACKGROUND

Soft magnetic base bodies containing a large number of soft magnetic metal particles made of a soft magnetic material are used as magnetic base bodies of coil components. In the soft magnetic base body, the surfaces of the soft magnetic metal particles are covered with insulating films, and adjacent soft magnetic metal particles are bonded to each other via the insulating films. Since the soft magnetic base body is less prone to magnetic saturation than a magnetic base body made of ferrite, the soft magnetic base body is suitable for coil components used in large-current circuits.

The soft magnetic metal particles are made of, for example, a soft magnetic material mainly composed of Fe. The soft magnetic material used to make the Fe-based soft magnetic metal particles further contains additive elements such as Si, Cr, and Al in addition to Fe to improve magnetic and insulating properties.

The magnetic base body are made by mixing soft magnetic metal powder (raw material powder) of the soft magnetic material with resin to produce a mixed resin composition, and then heating this mixed resin composition. During the heat treatment, the additive elements (e.g., Si, Cr, Al) contained in the powder particles are oxidized on the surface of each powder particle. Thus, an oxide film containing oxides of the elements of the raw material powder is formed on the surface of the soft magnetic metal particles. This oxide film electrically insulates the adjacent soft magnetic metal particles.

Soft magnetic base bodies containing Fe-based soft magnetic metal particles are described in, for example, Japanese Patent Application Publication No. 2013-046055, International Publication No. WO 2018/180659, and Japanese Patent Application Publication No. 2012-238842.

By increasing the Fe content ratio in the soft magnetic metal particles that form the magnetic base body, the magnetic permeability and DC bias characteristic of the magnetic base body can be improved. Therefore, it is desirable to increase the Fe content ratio in the soft magnetic metal particles.

However, when the magnetic base body is produced using raw material powder with a high Fe content ratio, the Fe contained in the raw material powder is excessively oxidized during the heat treatment, and the desired magnetic properties cannot be obtained. Whereas when the raw material powder is heated in an atmosphere with low oxygen concentration to control the Fe oxidation, the supply of oxygen to the additive elements becomes insufficient, which results in formation of the oxide film with insufficient thickness on the surface of the soft magnetic metal particles. Consequently, electrical insulation between the adjacent soft magnetic metal particles cannot be secured.

SUMMARY

It is an object of the present disclosure to provide a technical improvement which solves or alleviates at least part of the drawbacks mentioned above. One of the more specific objects of the disclosure is to provide a coil component having a magnetic base body with an improved Fe content ratio in the soft magnetic metal particles and an excellent insulation performance.

Other objects of the disclosure will be made apparent through the entire description in the specification. The inventions recited in the claims may also address any other drawbacks in addition to the above drawback.

A coil component according to one aspect of the disclosure includes: a magnetic base body including a plurality of soft magnetic metal particles that contain Fe and Si, and an oxide film provided on the surface of each of the plurality of soft magnetic metal particles; and a coil conductor provided in the magnetic base body. The base body includes a plurality of metal magnetic particles, the plurality of metal magnetic particles containing Fe, Si, and an element A, the element A being at least one selected from the group consisting of Cr and Al. Each of the plurality of soft magnetic metal particles is divided into a central region and a surface region radially outward of the central region. The surface region contains a higher atomic proportion of Si than the central region. The plurality of soft magnetic metal particles includes a plurality of first soft magnetic metal particles. Each of the plurality of first soft magnetic metal particles includes a plurality of Si—O precipitates containing Si and O in the surface region, and the plurality of Si—O precipitates are separated from each other.

Advantageous Effects

According to the aspect of the disclosure, it is possible to provide a coil component having a magnetic base body with an improved Fe content ratio in the soft magnetic metal particles and an excellent insulation performance.

DESCRIPTION OF THE EMBODIMENTS

Figure 1:
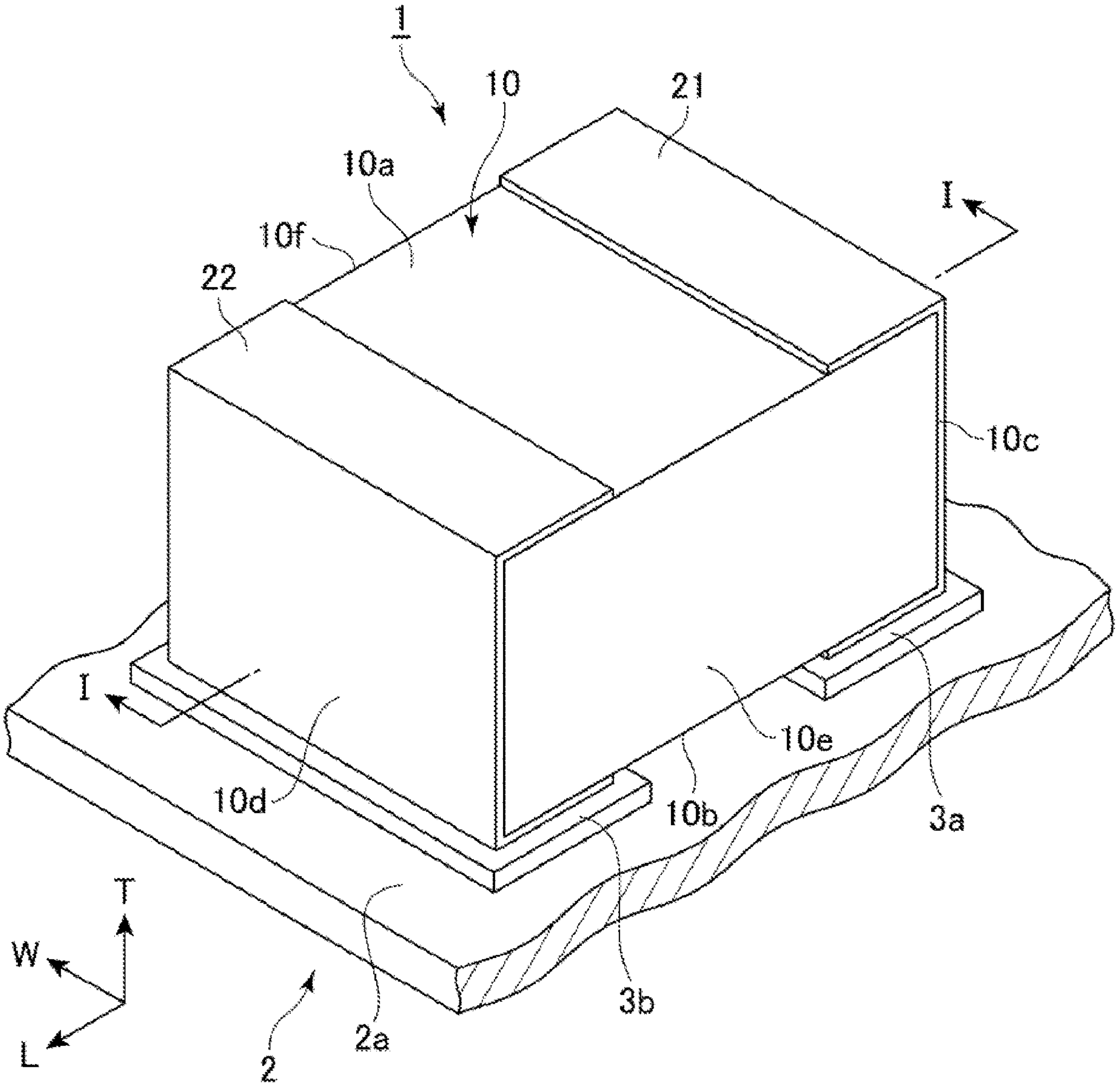
FIG. 1 is a schematic perspective view showing a coil component including a magnetic composite body according to one embodiment of the present invention.

Various embodiments of the present invention will be hereinafter described with reference to the accompanying drawings. Throughout the drawings, the same components are denoted by the same reference numerals. For convenience of explanation, the drawings are not necessarily drawn to scale. The following embodiments of the present invention do not limit the scope of the claims. The elements included in the following embodiments are not necessarily essential to solve the problem addressed by the invention.

One embodiment of the disclosure herein described relates mainly to coil components having magnetic base bodies. The magnetic base body contains a plurality of soft magnetic metal particles. The soft magnetic metal particles are mainly composed of Fe. The soft magnetic metal particles contain additive elements such as Cr, Al, and Si in addition to Fe. Each of the plurality of soft magnetic metal particles is coated by an oxide film including oxides of the additive elements with excellent insulation performance. The oxide film bonds adjacent ones of the plurality of soft magnetic metal particles. In each of the soft magnetic metal particle, the Si content ratio in the surface region is higher than that in the central region. During the heat treatment in the manufacturing process of the magnetic base body, there is a mechanism of inhibiting the penetration of oxygen into the interior of particles of the raw material powder by the oxide film formed on the surface of the particles. However, when the ratio of Fe in the raw material powder increases to, for example, 95 at % or more, the content ratio of the additive element decreases and it becomes difficult to form the oxide film with sufficient thickness on the surfaces of the particles of the raw material powder to inhibit the oxygen penetration. In one embodiment of the disclosure, oxygen that has penetrated into the interior of the particles of the raw material powder combines with Si present in the surface regions of the particles, thereby the oxidation of Fe in the central region is inhibited. In addition, because the heat treatment is carried out with heating conditions that are sufficient for oxygen to bond with Si inside the raw material powder, the oxide film formed on the surface of the soft magnetic metal particles has sufficient thickness to ensure electrical insulation, although oxygen may be allowed to pass through the film.

Figure 2:
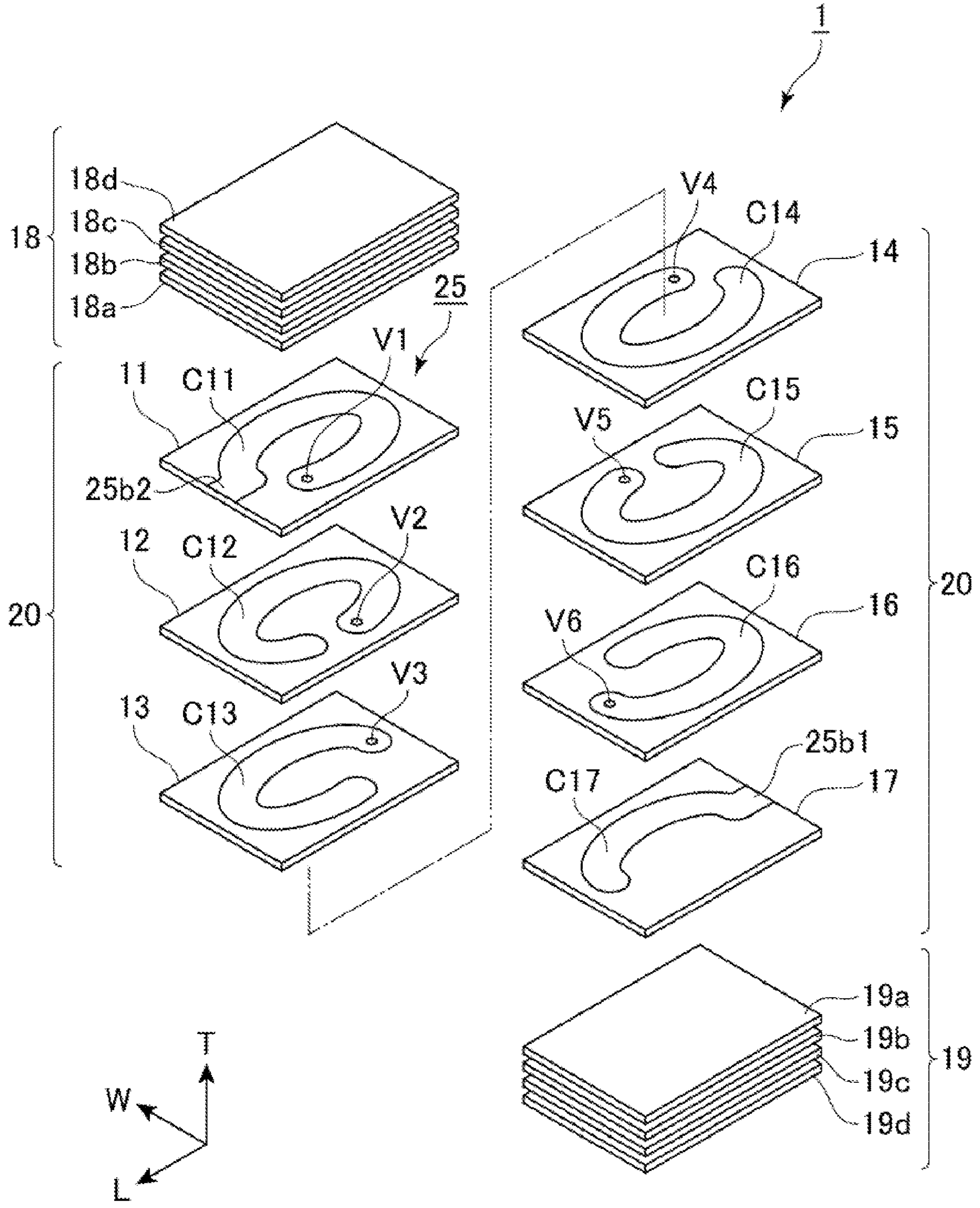
FIG. 2 is an exploded perspective view of the coil component shown in FIG. 1.
Figure 3:
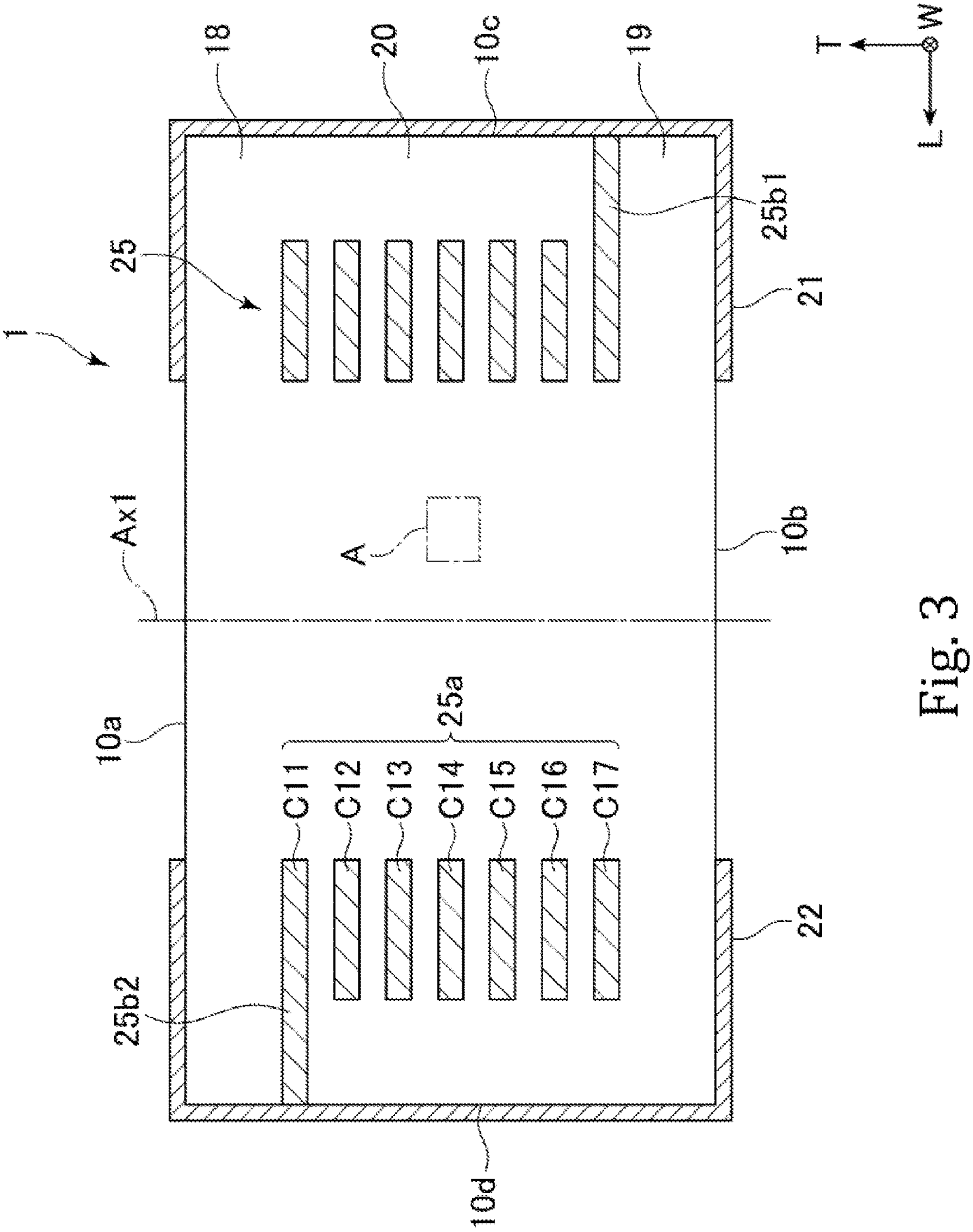
FIG. 3 is a sectional view schematically showing a section of the coil component of FIG. 1 along the line I-I.
Figure 4:
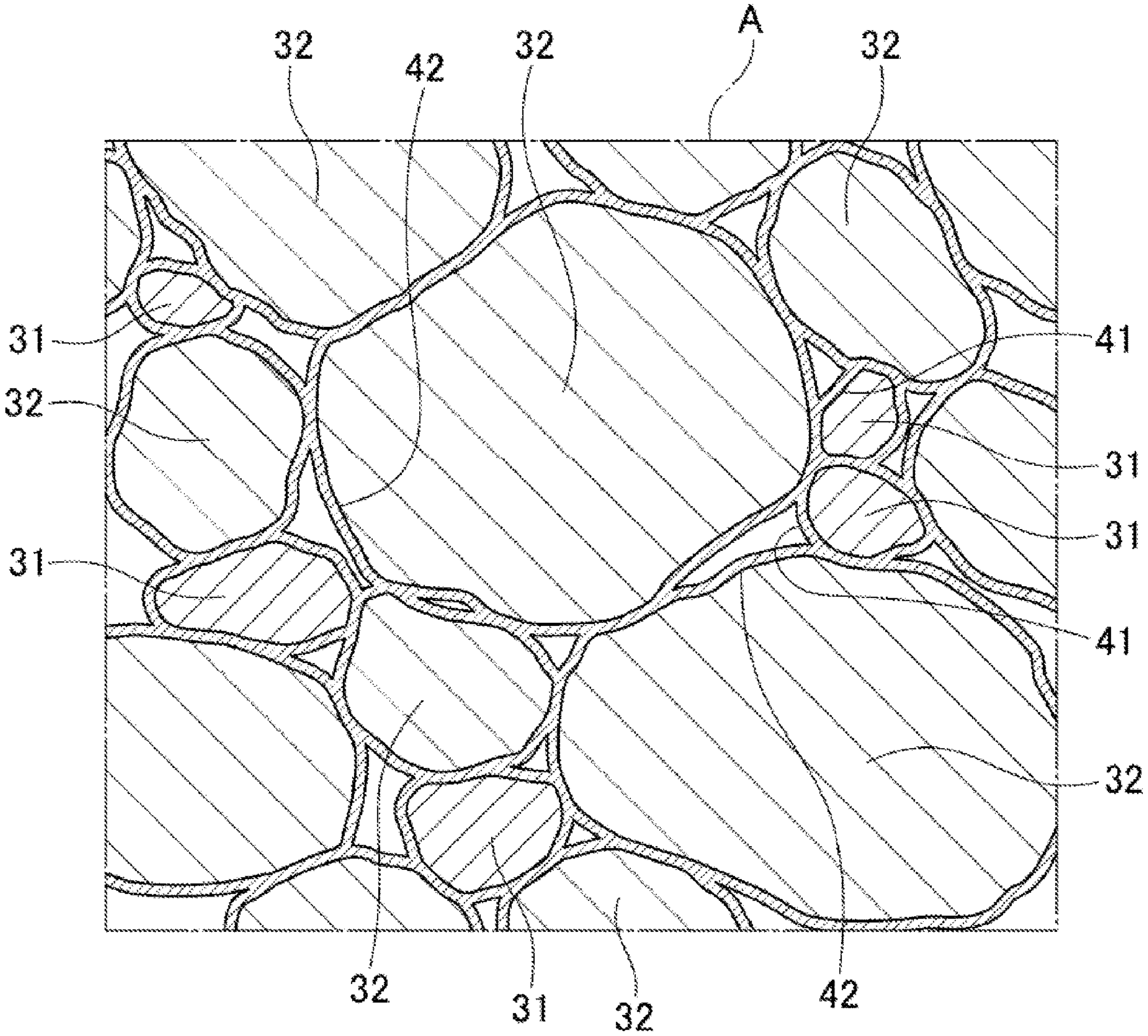
FIG. 4 is an enlarged sectional view schematically showing the region A of a base body.
Figure 5A:
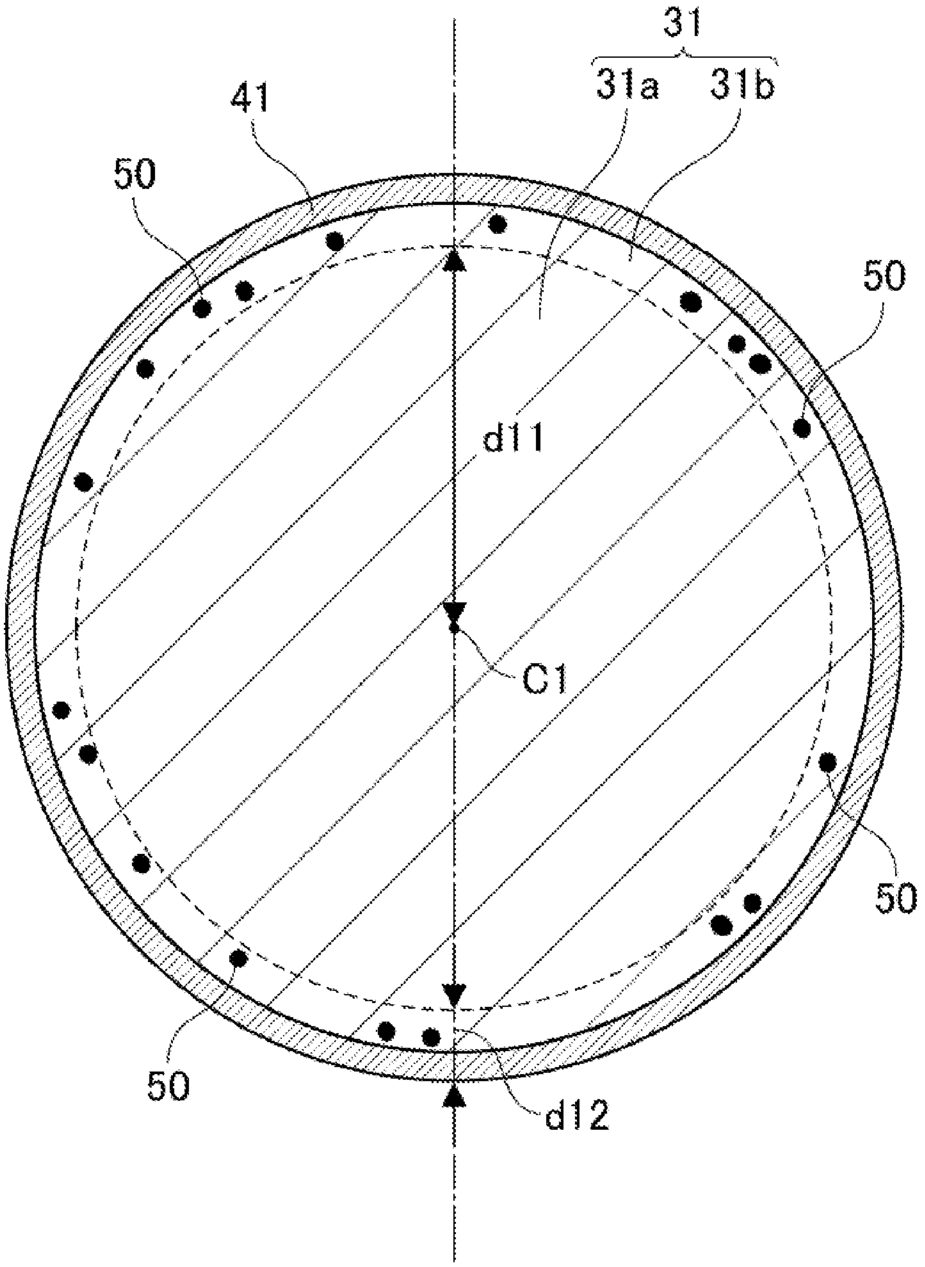
FIG. 5A is a sectional view schematically showing a cross-section of a first soft magnetic metal particle containing Si—O precipitates.
Figure 5B:
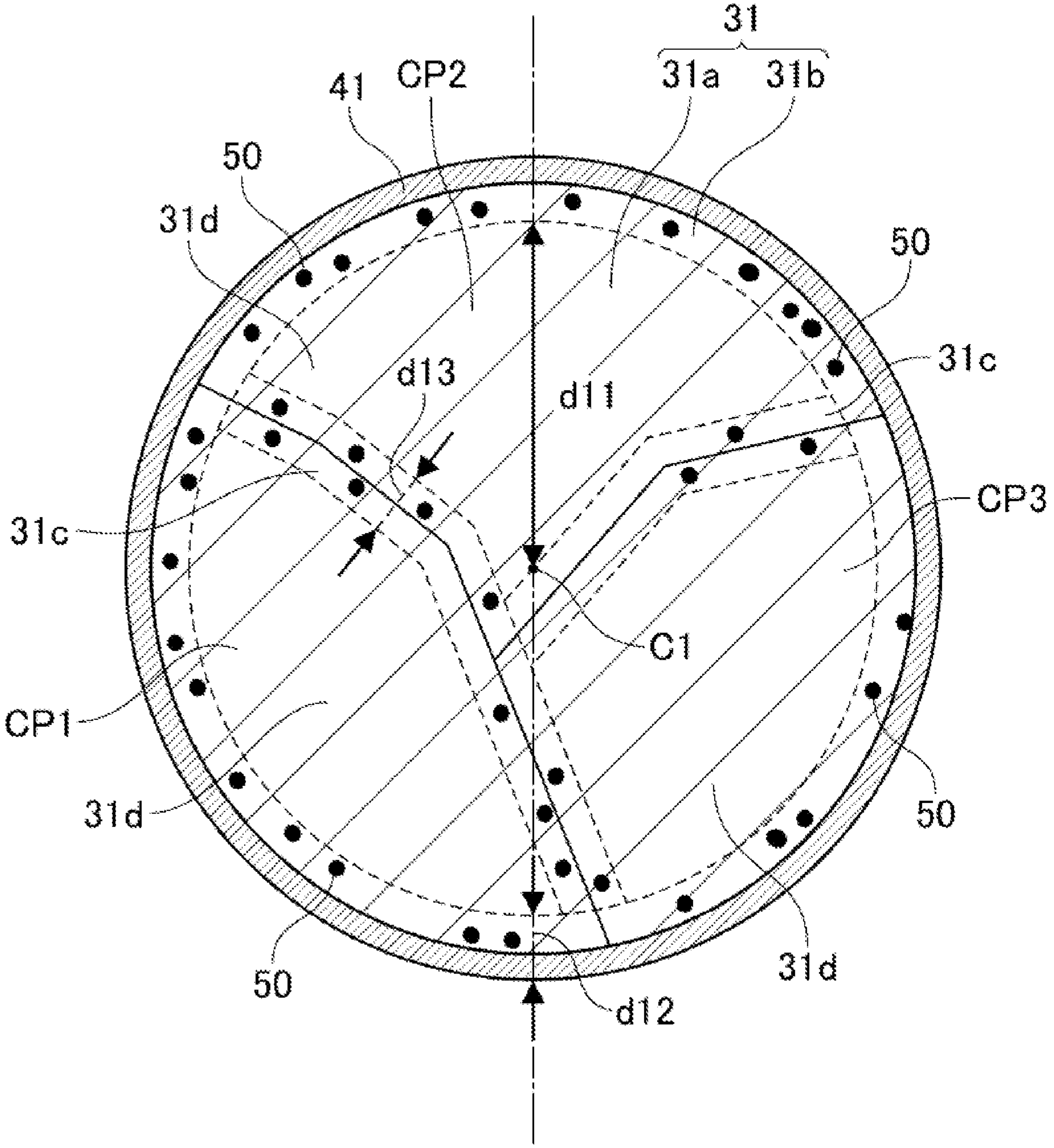
FIG. 5B is a sectional view schematically showing a cross-section of the first soft magnetic metal particle including Si—O precipitates in its central region.
Figure 6:
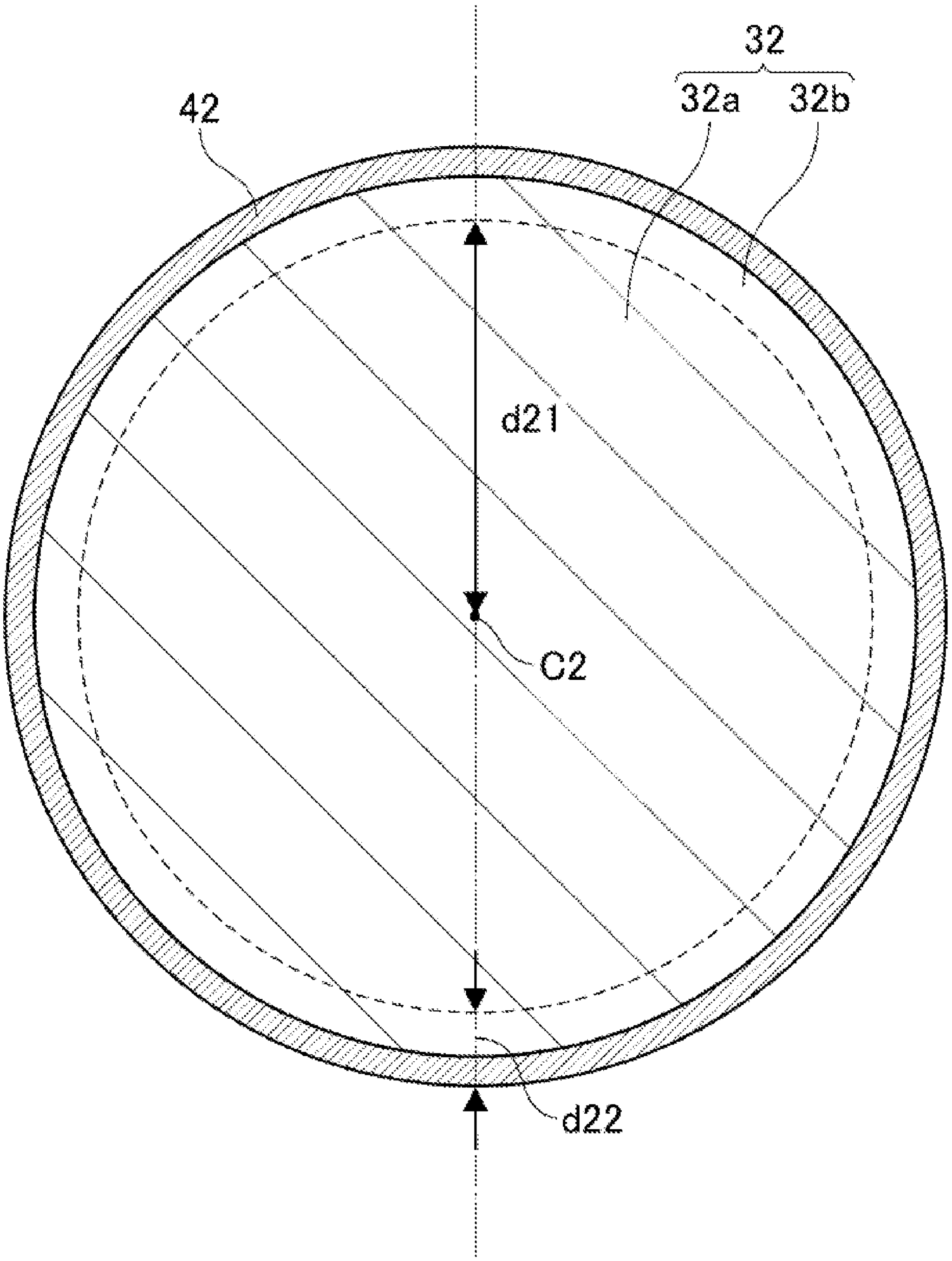
FIG. 6 schematically shows a cross-section of a second soft magnetic metal particle.

The following first describes a coil component 1 including a magnetic base body relating to one embodiment with reference to FIGS. 1 to 3, and then the microstructure of the magnetic base body with reference to FIGS. 4 to 6.

FIG. 1 is a schematic perspective view of the coil component 1, and FIG. 2 is an exploded perspective view of the coil component 1. FIG. 3 is a schematic sectional view of the coil component 1 along the line I-I of FIG. 1. In FIG. 2, external electrodes are not shown for convenience of description.

By way of one example of the coil component 1, FIGS. 1 to 3 show a laminated inductor. The laminated inductor shown is an example of the coil component 1 to which the invention can be applied. The invention can also be applied to various coil components other than the laminated inductor. For example, the coil component 1 may be applied to wire-wound coil components or planar coils.

As shown in the drawings, the coil component 1 includes a base body 10, a coil conductor 25 provided in the base body 10, an external electrode 21 disposed on a surface of the base body 10, and an external electrode 22 disposed on the surface of the base body 10 at a position spaced apart from the external electrode 21. The base body 10 is a magnetic base body made of a magnetic material. The base body 10 is an example of the feature "magnetic base body" recited in the claims. As described below, the base body 10 includes a number of soft magnetic metal particles.

The external electrode 21 is electrically connected to one end of the coil conductor 25, and the external electrode 22 is electrically connected to the other end of the coil conductor 25.

The coil component 1 may be mounted on a mounting substrate 2*a*. In the illustrated embodiment, the mounting substrate 2*a* has lands 3*a* and 3*b* provided thereon. The coil component 1 is mounted on the mounting substrate 2*a* by bonding the external electrode 21 to the land 3*a* and bonding the external electrode 22 to the land 3*b*. A circuit board 2 relating to one embodiment of the present invention includes the coil component 1 and the mounting substrate 2*a* having the coil component 1 mounted thereon. The circuit board 2 can be installed in various electronic devices. The electronic devices in which the circuit board 2 can be installed include smartphones, tablets, game consoles, electrical components of automobiles, servers, and various other electronic devices.

The coil component 1 may be an inductor, a transformer, a filter, a reactor, an inductor array and any one of various other coil components. The coil component 1 may alternatively be a coupled inductor, a choke coil, and any one of various other magnetically coupled coil components. Applications of the coil component 1 are not limited to those explicitly described herein.

In one embodiment of the present invention, the base body 10 is configured such that the dimension in the L-axis direction (length dimension) is greater than the dimension in the W-axis direction (width dimension) and the dimension in the T-axis direction (height dimension). For example, the length dimension is from 1.0 mm to 6.0 mm, the width dimension is from 0.5 mm to 4.5 mm, and the height dimension is from 0.5 mm to 4.5 mm. The dimensions of the base body are not limited to those specified herein. The term "rectangular parallelepiped" or "rectangular parallelepiped shape" used herein is not intended to mean solely "rectangular parallelepiped" in a mathematically strict sense. The dimensions and shape of the base body 10 are not limited to those specified herein.

The base body 10 has a first principal surface 10*a*, a second principal surface 10*b*, a first end surface 10*c*, a second end surface 10*d*, a first side surface 10*e*, and a second side surface 10*f*. These six surfaces define the outer surface of the base body 10. The first principal surface 10*a* and the second principal surface 10*b* are at the opposite ends in the height direction of the base body 10, the first end surface and the second end surface 10*d* are at the opposite ends in the length direction of the base body 10, and the first side surface 10*e* and the second side surface 10*f* are at the opposite ends in the width direction of the base body 10. As shown in FIG. 1, the first principal surface 10*a* is at the top of the base body 10, and therefore, the first principal surface 10*a* may be referred to as a "top surface." Likewise, the second principal surface 10*b* may be referred to as a "lower surface" or "bottom surface." Since the coil component 1 is disposed such that the second principal surface 10*b* faces the mounting substrate 2*a*, the second principal surface 10*b* may be herein referred to as "the mounting surface." The top surface 10*a* and the bottom surface are separated from each other by a distance equal to the height of the base body the first end surface 10*c* and the second end surface 10*d* are separated from each other by a distance equal to the length of the base body 10, and the first side surface and the second side surface 10*f* are separated from each other by a distance equal to the width of the base body 10.

As shown in FIG. 2, the base body 10 includes a magnetic film 20, a top cover layer 18 provided on the top-side surface of the magnetic film 20, and a bottom cover layer 19 provided on the bottom-side surface of the magnetic film 20. The top cover layer 18, bottom cover layer 19, and magnetic film 20 are the components of the base body 10.

The magnetic film 20 includes magnetic films 11 to 17. In the magnetic film 20, the magnetic films 17, 16, 15, 14, 13, 12 and 11 are stacked in the stated order from the negative side to the positive side in the T direction.

The magnetic films 11 to 17 respectively have conductor patterns C11 to C17 formed on the top-side surface thereof. The conductor patterns C11 to C17 each extend around a coil axis Ax1 within a plane (the LW plane) orthogonal to the coil axis Ax1 (see FIG. 3). The conductor patterns C11 to C17 are formed by, for example, printing a conductive paste made of a highly conductive metal or alloy via screen printing. The conductive paste may be made of Ag, Pd, Cu, Al, or alloys thereof. The conductive paste is produced by kneading conductive powder formed of a conductive material with excellent conductivity, such as Ag, Pd, Cu, Al, or their alloys, with a binder resin and solvent. When Cu powder is used as the conductive powder, a pyrolytic resin such as acrylic resin may be used as the binder resin to prevent excessive oxidation of the Cu powder during degreasing. The pyrolytic resin is decomposed without combustion reaction with oxygen. The pyrolytic resin is decomposed pyrolytically when the temperature is raised in a non-oxygen atmosphere (e.g., nitrogen atmosphere) and leave no residue. Therefore, by using the pyrolytic resin as the binder resin, the degreasing treatment can be performed in a non-oxygen atmosphere. Examples of the acrylic resin for the conductive paste include (meth)acrylic acid copolymers, (meth)acrylic acid-(meth)acrylic ester copolymers, styrene-(meth)acrylic acid copolymers, or styrene-(meth) acrylic acid-(meth)acrylic ester copolymers. The solvent may be toluene, ethanol, turpineol, or mixtures of these. The conductive paste may contain modifiers for adjusting thixotropy. The conductor patterns C11 to C17 may be formed using other methods and materials. For example, the conductor patterns C11 to C17 may be formed by sputtering, ink-jetting, or other known methods.

The magnetic films 11 to 16 have vias V1 to V6, respectively, at a predetermined position therein. The vias V1 to V6 are formed by forming a through-hole in the magnetic films 11 to 16 at the predetermined position so as to extend through the magnetic films 11 to 16 in the T axis direction and filling the through-hole with a conductive material.

Each of the conductor patterns C11 to C17 is electrically connected to the respective adjacent conductor patterns through the vias V1 to V6. The conductor patterns C11 to C17 and the vias V1 to V6 connected together in this manner form the spiral coil conductor 25. In other words, the coil conductor 25 is constituted by the conductor patterns C11 to C17 and the vias V1 to V6.

The end of the conductor pattern C11 opposite to the end thereof connected to the via V1 is connected to the external electrode 22. The end of the conductor pattern C17 opposite to the end thereof connected to the via V6 is connected to the external electrode 21.

The top cover layer 18 includes magnetic films 18*a* to 18*d* made of a magnetic material, and the bottom cover layer 19 includes magnetic films 19*a* to 19*d* made of a magnetic material. In this specification of the present invention, the magnetic films 18*a* to 18*d* and the magnetic films 19*a* to 19*d* may be referred to collectively as "the cover layer magnetic films."

As shown in FIG. 3, the coil conductor 25 includes a winding portion 25*a* wound around the coil axis Ax extending along the thickness direction (T-axis direction), a lead-out portion 25*b*1 that connects one end of the winding portion 25*a* to the first end surface 10*c* of the base body 10, and a lead-out portion 25*b*2 that connects the other end of the winding portion 25*a* to the second end surface 10*d* of the base body 10.

The following now describes the microstructure of the base body 10 with reference to FIG. 4. FIG. 4 is a schematic enlarged view of the region A indicated in FIG. 3. The region A is a partial region of the section of the base body 10 cut along the T-axis. The region A may be any region of the section of the base body 10 that is obtained by cutting the base body 10 along the T-axis.

As shown in FIG. 4, the base body 10 contains a plurality of soft magnetic metal particles. The soft magnetic metal particles in the base body 10 include first soft magnetic metal particles 31 and second soft magnetic metal particles 32. The first soft magnetic metal particles 31 include Si—O precipitates containing Si and O, while the second soft magnetic metal particle 32 does not include the Si—O precipitates. The details of Si—O precipitates are described later.

In one embodiment, the ratio of the number of soft magnetic metal particles 31 to the total number of soft magnetic metal particles (the sum of the number of first soft magnetic metal particles 31 and the number of second soft magnetic metal particles 32) contained in the base body 10 (hereinafter simply referred to as "Si—O precipitates ratio") is, for example, between 1% and 10% (both inclusive). In other words, 1% to 10% of the soft magnetic metal particles in the base body 10 may contain the Si—O precipitates. In one embodiment, the Si—O precipitation percentage may be between 1% and 10%, between 1% and 9%, between 1% and 8%, between 1% and 7%, between 1% and 6%, between 1% and 5%, between 1% and 4%, or between 1% and 3% (both inclusive). The lower limit of the Si—O precipitation ratio may be 2%. The ratio of the number of first soft magnetic metal particles 31 to the total number of soft magnetic metal particles in the base body 10 (Si—O precipitation ratio) is determined as follows. The base body 10 is cut in the thickness direction (the T-axis direction) to expose a section, and an image of the section is captured using a scan electron microscope (SEM) with a predetermined magnification factor (for example, a magnification factor of 5,000 to 30,000) to obtain an SEM image showing as an observation field a part of the section of the base body 10. Next, the soft magnetic metal particles in the SEM image obtained by the image capturing are distinguished into the first soft magnetic metal particle 31 and the second soft magnetic metal particle 32 depending on whether Si—O precipitates are included or not. When Si and O elements are detected at the same detection position inside the soft magnetic metal particle by elemental mapping, it can be determined that the soft magnetic metal particle contains Si—O precipitates. The number of the first soft magnetic metal particles 31 included in the observation field of view divided by the total number of soft magnetic metal particles can then be considered as the ratio of the number of the first soft magnetic metal particles 31 to the total number of soft magnetic metal particles in the base body 10 (Si—O precipitation ratio). Two or more observation fields of view may be defined in the section of the base body 10, the ratio of the number of first soft magnetic metal particles 31 to the total number of soft magnetic metal particles included in each field of view may be determined, and the average value of the ratios determined for the fields of view may be used as the Si—O precipitation ratio. The number of observation fields of view can be any number between 5 and 10, both inclusive, for example.

The surface of the first soft magnetic metal particle 31 is covered with an oxide film 41 with excellent insulation performance. Similarly, the surface of the second soft magnetic metal particle 32 is covered with an oxide film 42 with excellent insulation performance. The oxide film 41 preferably cover the entire surface of the first soft magnetic metal particle 31, and the oxide film 42 preferably cover the entire surface of the second soft magnetic metal particle 32. In the base body 10, each soft magnetic metal particle is bonded to the adjacent soft magnetic metal particles via the oxide film on their respective surfaces. In other words, the oxide films on the surfaces of each of the adjacent soft magnetic metal particles are bonded to each other, and this bonding between the oxide films bonds the soft magnetic metal particles covered with the oxide films to each other. For example, the first soft magnetic metal particle 31 is bonded to the second soft magnetic metal particle 32 adjacent to the first soft magnetic metal particle 31 via the oxide film 41 on the surface of the first soft magnetic metal particle 31 and the oxide film 42 on the surface of the second soft magnetic metal particle 32. The oxide film 41 and oxide film 42 provide electrical insulation between the first soft magnetic metal particles 31, between the second soft magnetic metal particles 32, or between the first soft magnetic metal particles 31 and the second soft magnetic metal particles 32.

The soft magnetic metal particles in the base body 10 are obtained by heating soft magnetic metal powder (raw material powder). As described later, the base body 10 can be made by mixing soft magnetic metal powder of the soft magnetic material with resin to produce a mixed resin composition, and then heating this mixed resin composition. The heat treatment in the manufacturing process of the base body 10 yields, from soft magnetic metal powder, the soft magnetic metal particles with the oxide film formed thereon.

The "soft magnetic metal particles in the base body 10" herein include the first soft magnetic metal particles 31 and the second soft magnetic metal particles 32. Thus, the description of the "soft magnetic metal particles in the base body 10" applies to both the first soft magnetic metal particles 31 and the second soft magnetic metal particles 32, unless otherwise construed.

The raw material powder of the soft magnetic metal particles included in the base body 10 are mainly composed of Fe. The raw material powder of the soft magnetic metal particles in the base body 10 contains Si and element A in addition to Fe. Element A is Cr or Al or both. In other words, the raw material powder of the soft magnetic metal particles included in the base body 10 may contain Cr or Al or both in addition to Fe and Si. In the soft magnetic metal particles obtained by heating the raw material powder, the ratio of Fe to the sum of Fe and Si, Cr, and Al may be 95 at % or greater. Comparing the atomic proportion of Si in the raw material powder with the sum of the atomic proportion(s) of element(s) A, the atomic proportion of Si is greater than the sum of the atomic proportion(s) of element(s) A. The raw material powder of the soft magnetic metal particles in the base body 10 may contain trace amounts of element(s) other than Fe, Si, and element A. Elements that can be present in trace amounts in the raw material powder of the soft magnetic metal particles include zinc (Zr), boron (B), carbon (C), and nickel (Ni).

The oxide film containing oxides of the elements of the raw material powder is formed on the surface of the soft magnetic metal particles included in the base body 10. The "oxide film on the surface of the soft magnetic metal particles included in the base body 10" includes the oxide film 41 on the surface of the first soft magnetic metal particle 31 and the oxide film 42 on the surface of the second soft magnetic metal particle 32. For convenience of description, the oxide film on the surface of the soft magnetic metal particles included in the base body 10 may also be simply referred to as the "oxide film". Since Si and element A (Cr, Al) are more easily oxidized than Fe, when the raw material powder contains Fe, Si, and the element A, the oxide film includes oxides of Si and the element A. The oxide film may also include oxides of Fe.

The average particle size of the soft magnetic metal particles can be, for example, within the range of 1 μm to 50 μm. The average particle size of the soft magnetic metal particles contained in the base body 10 is determined in the following manner. The base body 10 is cut along the thickness direction (the T axis direction) to expose a section. The section is photographed using a scanning electron microscope (SEM) to obtain a SEM image, and the volume-weighted particle size distribution is determined based on the SEM image. The particle size distribution is used to determine the average particle size. For example, the average particle size (the median diameter (D50)) calculated based on the volume-weighted particle size distribution obtained based on the SEM image can be used as the average particle size of the soft magnetic metal particles contained in the base body 10.

The first soft magnetic metal particle 31 will be further described in detail with reference to FIGS. 5A and 5B. FIGS. 5A and 5B schematically show a section of one of the plurality of first soft magnetic metal particles 31 included in the base body 10. In FIGS. 5A and 5B, the section of the first soft magnetic metal particle 31 is depicted to have a circular form for convenience. The first soft magnetic metal particle 31 in the base body 10 can take various shapes other than circular, as shown in FIG. 4. FIGS. 5A and 5B also illustrate the oxide film 41 on the surface of the first soft magnetic metal particle 31.

As shown in FIGS. 5A and 5B, the first soft magnetic metal particle 31 is divided into a central region 31*a* and a surface region 31*b*. FIG. 5A shows the first soft magnetic metal particle 31 containing a Si—O precipitate 50 only in the surface region 31*b*, and FIG. 5B shows the first soft magnetic metal particle 31 containing the Si—O precipitate 50 also in a part of the central region 31*a*. The Si—O precipitate 50 will be described later. The central region 31*a* includes the geometric center C1 of the section of the first soft magnetic metal particle 31 shown in FIG. 5. The surface region 31*b* is radially outward from the central region 31*a*. The surface region 31*b* covers the outer surface of the central region 31*a*. Thus, the surface region 31*b* extends along the surface of the first soft magnetic metal particle 31 on the radially outer side of the central region 31*a*.

In the radial direction of the first soft magnetic metal particle 31, the surface region 31*b* has a width d12. In one embodiment, the width d12 of the surface region 31*b* is 10% of the Haywood diameter of the first soft magnetic metal particle 31. The width d12 of the surface region 31*b* may be less than 10% of the Haywood diameter of the first soft magnetic metal particle 31. A radial dimension d11 of the central region 31*a* corresponds to the difference between the dimension between the geometric center C1 of the first soft magnetic metal particle 31 and its surface and the width d12 of the surface region 31*b*.

The soft magnetic metal particles in the base body 10 may have a plurality of metal crystal grains within the particles. The first soft magnetic metal particle 31 may have a plurality of crystal grains. As shown in FIG. 5B, when the first soft magnetic metal particle 31 has a plurality of crystal grains CP1 to CP3, a grain boundary regions 31*c* are defined along the boundaries of crystal grains CP1 to CP3 within the first soft magnetic metal particle 31. A width d13 of the grain boundary region 31*c* is as large as the width d12 of the surface region 31*b*. In each of the grains CP1 to CP3, the region inside the grain boundary region 31*c* and surrounded by the grain boundary region 31*c* is called a grain inner region 31*d*. The grain inner region 31*d* is included in the central region 31*a*. The grain inner region 31*d* does not overlap with the surface region 31*b* and the grain boundary region 31*c*.

When the surface region 31*b* contains the Si—O precipitate 50 while the central region 31*a* does not contain the Si—O precipitate 50 as shown in FIG. 5A, the first soft magnetic metal particle 31 contains equal to or more than 95 at % of Fe in the central region 31*a*. In this case, the Fe content ratio in the central region 31*a* may be 97 at % or greater, 98 at % or greater, or 99 at % or greater. When the grain boundary region 31*c* also contains the Si—O precipitate 50 as shown in FIG. 5B, the first soft magnetic metal particle 31 contains equal to or more than 95 at % of Fe in the grain inner region 31*d*. In this case, the Fe content ratio in the grain inner region 31*d* may be 97 at % or greater, 98 at % or greater, or 99 at % or greater. In the plurality of soft magnetic metal particles in conventional magnetic base bodies, the Fe content ratio is about 92 at % at the highest, and 95 at % or higher Fe content ratio has not been realized. The Fe content ratio in the central region 31*a* or the crystal grain inner region 31*d* of the first soft magnetic metal particle 31 is higher than the previously realized content ratio of about 92 at %. When the first soft magnetic metal particles 31 are formed from the raw material powder, an oxide film is formed on the surfaces of the particles of the raw material powder, and this oxide film inhibits the penetration of oxygen inside the particles of the raw material powder. However, when the ratio of Fe in the raw material powder increases to, for example, 95 at % or more, the content ratio of the additive element decreases and it becomes difficult to form the oxide film with sufficient thickness on the surfaces of the particles of the raw material powder to inhibit the oxygen penetration. Consequently, oxygen penetrates into the interior of some of the powder particles (e.g., 1% to 10% of the total number of the particles) where the oxide films with sufficient thickness are not formed thereon. The oxygen that thus penetrated into the powder particles combines with Si in the surface area 31*b* to form Si—O precipitate 50. Thus, by capturing the oxygen that penetrates into the interior of the raw powder particles with the Si present in the surface regions 31*b*, the oxygen reaches the central regions 31*a*, and the oxidation of Fe in the central regions 31*a* are inhibited.

The content ratio of Fe in the first soft magnetic metal particle 31 is measured by cutting the base body 10 along the coil axis Ax to expose a section of the base body 10 and performing energy dispersive X-ray spectroscopy (EDS) analysis on this section. The Fe content ratio can be measured by scan electron microscope (SEM) equipped with an energy dispersive X-ray spectroscopy (EDS) detector. EDS analysis by the SEM equipped with the EDS detector is called SEM-EDS analysis. The Fe content ratio is measured, for example, using a scanning electron microscope SU7000 manufactured by Hitachi High-Tech Corporation and an energy dispersive X-ray spectroscopic detector Octane Elite manufactured by Ametek Corporation at an acceleration voltage of 5 kV. The content ratios of elements other than Fe in the first soft magnetic metal particles 31 are also measured by the SEM-EDS analysis in the same way as the Fe content ratio.

The first soft magnetic metal particle 31 may contain Si in addition to Fe in the central region 31*a*. The Si content ratio in the central region 31*a* may be between 0.01 at % and 1.0 at %, both inclusive. Si may not be contained in the central region 31*a* of the first soft magnetic metal particle 31 in which the Si—O precipitates 50 are contained only in the surface region 31*b* as shown in FIG. 5A. The content ratio of Si in the central region 31*a* is measured by SEM-EDS analysis as described above. If Si is not detected in the central region 31*a* by the SEM-EDS analysis, it is determined that there is no Si in the central region 31*a*, although Si may actually be contained below the detection limit of SEM-EDS analysis. In the SEM-EDS analysis of the first soft magnetic metal particle 31, an integrated measurement is performed such that the count of the L-line peak of the Fe element becomes more than 100000 counts. When the peak intensity of the quantitative element exceeds three times the standard deviation a of the background level, that is, 3*a*, it is determined that the quantified element is included in the particle. Specifically, since the standard deviation a of the background level is the square root of the background level, it can be determined that the quantitative element is present at the position where the count value of the quantitative element is more than three times the square root of the background level. In other words, the count value of three times the square root of the background level is the detection limit. To determine whether Si is included in the central region 31*a* or not, the EDS analysis is performed on the SEM image of the section of the first soft magnetic metal particle 31 to obtain mapping data of the Si element, and when there is any position in the central region 31*a* that shows a peak intensity of the Si element above the detection limit in this mapping data, it can be determined that the Si element is included in the central region 31*a*. Whereas when the peak intensity of the Si element is below the detection limit in all areas of the central region 31*a*, it is determined that the central region 31*a* does not contain the Si element. It can be determined that the Si element is present at the position where the Si detection value is more than three times the square root of the background Si detection value.

The central region 31*a* may contain Cr in a smaller atomic proportion than Si. The central region 31*a* may contain Al in a smaller proportion than Si. The central region 31*a* may contain Cr and Al. In this case, both the content ratio of Cr and the content ratio of Al are smaller than the content ratio of Si. The central region 31*a* may not contain Cr. The central region 31*a* may not contain Al. The central region 31*a* may not contain any element A. It can be determined that the central region 31*a* does not contain Cr when Cr is not detected in the central region 31a by SEM-EDS analysis.

Similarly, when Al is not detected in the central region 31*a* by SEM-EDS analysis, it can be determined that the central region 31*a* does not contain Al. When describing the content ratio of an element, it is expressed as the molar ratio (atomic percent) of the element, unless otherwise specified.

The surface region 31*b* contains a higher atomic proportion of Si than the central region 31*a*. Some of the Si contained in the surface region 31*b* is combined with oxygen (O) and precipitated as the Si—O precipitate 50. Specifically, Si—O is produced by the combination of Si and oxygen, and a plurality of these produced Si—O are gathered together and precipitated as Si—O precipitate 50. The Si—O precipitate 50 are contained in the surface region 31*b* of the first soft magnetic metal particle 31. The surface region 31*b* may include a plurality of Si—O precipitates 50. The surface region 31*b* may contain from several to several hundred Si—O precipitates 50. The plurality of Si—O precipitates 50 are separated from each other. In other words, the Si—O precipitates 50 precipitate in the surface region 31*b* in the form of particles separated from each other rather than in a continuous layer. The Si that had been present in the surface region 31*b* before binding with oxygen is now concentrated in the Si—O precipitates 50 as it combined with oxygen that entered the soft magnetic metal particle 31, so that the Si content is reduced in the areas of the surface region 31*b* other than the Si—O precipitates 50 present in the surface region 31*b*. Therefore, a concentration gradient of Si occurs between the central region 31*a* and the surface region 31*b*, and this gradient facilitates Si migration from the central region 31*a* to the surface region 31*b*. As a result, the Si content in the central region 31*a* also decreases. And as a result of the decrease of Si in the central region 31*a*, the Fe content ratio in the central region 31*a* increases.

As shown in FIG. 5B, in the first soft magnetic metal particle 31 containing multiple crystal grains, Si—O precipitates may precipitate in the grain boundary region 31*c* in addition to the surface region 31*b*. Since oxygen easily penetrates into the crystal grain boundary of the first soft magnetic metal particle 31, the Si—O precipitates 50 precipitate in the grain boundary region 31*c* when Si contained in the grain boundary region 31*c* in the vicinity of this grain boundary combines with oxygen. The outer grain boundary regions of the surface region 31*b* and the central region 31*a* may contain from several to several hundred Si—O precipitates 50. The Si—O precipitates 50 in the grain boundary region 31*c* are at least better than the Si—O precipitates 50 in the surface region 31*b* because the grain boundary region 31*c* has a larger oxygen penetration distance than the surface region 31*b*. The plurality of Si—O precipitates 50 in the grain boundary region 31*c* are also separated from each other. That is, the Si—O precipitates 50 also precipitate in the grain boundary region 31*c* in the form of particles that are separated from each other rather than in a continuous layer. The Si that had been present in the surface region 31*b* before binding with oxygen is now concentrated in the Si—O precipitates 50 after binding with oxygen penetrated the grain boundary region 31*c*, so that the Si content is reduced in the areas of the grain boundary region 31*c* other than the Si—O precipitates 50 present in the grain boundary region 31*c*. Therefore, a concentration gradient of Si occurs between the grain inner region 31*d* and the grain boundary region 31*c* in the grains CP1-CP3, and this gradient facilitates the migration of Si from the grain inner region 31*d* to the grain boundary region 31*c* of the grains CP1-CP3. As a result, the Si content in the grain inner region 31*d* of the grains CP1-CP3 also decreases. And as a result of the decrease of Si in the grain inner region 31*d*, the Fe content ratio in the grain inner region 31*d* increases.

As described above, the Fe content ratio in the central region 31*a* is increased when the Si—O precipitates 50 precipitate only in the surface region 31*b* of the first soft magnetic metal particle 31, as shown in FIG. 5A. In this case, the Fe content ratio in the central region 31*a* may be 97 at % or greater, 98 at % or greater, or 99 at % or greater.

Further, when the Si—O precipitates 50 precipitate in the surface region 31*b* and grain boundary region 31*c* of the first soft magnetic metal particle 31, as shown in FIG. 5B, the Fe content ratio in the grain inner region 31*d* of the central region 31*a* is increased. In this case, the Fe content ratio in the grain inner region 31*d* may be 97 at % or greater, 98 at % or greater, or 99 at % or greater.

Precipitation of the Si—O precipitates 50 in the surface region 31*b* and/or the grain boundary region 31*c* can be confirmed as follows. First, the base body 10 is cut along the T-axis direction to expose a section, and the section is photographed by a scanning electron microscope (SEM) at a specified magnification to obtain an SEM image. The EDS analysis is performed on this SEM image to obtain a distribution image of Si and O elements (mixture map of Si and O). In this distribution image, it can be determined that the Si—O precipitates 50 exist in the areas where Si and O elements are present in a grain form.

The oxide film 41 covers the surface region 31*b* of the first soft magnetic metal particle 31. The oxide film 41 contains a highly insulating oxide. The oxide film 41 includes oxides of Si and oxides of the element A (oxides of Cr and/or Al). Both oxides of Si and oxides of the element A have an excellent insulating performance. The oxide film 41 may contain oxides of Fe. The oxide film 41 preferably covers the entire surface region 31*b* of the first soft magnetic metal particle 31. The oxide film 41 preferably has a thickness (radial dimension) of 5 nm or more.

The second soft magnetic metal particle 32 will be further described in detail with reference to FIG. 6. FIG. 6 schematically show a section of one of the plurality of second soft magnetic metal particles 32 included in the base body 10. In FIG. 6, the section of the second soft magnetic metal particle 32 is depicted to have a circular form for convenience. The second soft magnetic metal particle 32 in the base body 10 can take various shapes other than circular, as shown in FIG. 4. FIG. 6 also illustrate the oxide film 42 on the surface of the second soft magnetic metal particle 32.

As shown in FIG. 6, the second soft magnetic metal particle 32 is divided into a central region 32*a* and a surface region 32*b*. The central region 32*a* includes the geometric center C2 of the section of the second soft magnetic metal particle 32 shown in FIG. 6. The surface region 32*b* is radially outward from the central region 32*a*. The surface region 32*b* covers the outer surface of the central region 32*a*. Thus, the surface region 32*b* extends along the surface of the second soft magnetic metal particle 32 on the radially outer side of the central region 32*a*.

The surface region 32*b* has a width d22 in the radial direction of the second soft magnetic metal particle 32. In one embodiment, the width d22 of the surface region 32*b* is 10% of the Haywood diameter of the second soft magnetic metal particle 32. The width d22 of the surface region 32*b* may be equal to or less than 10% of the Heywood diameter of the second soft magnetic metal particle 32. A radial dimension d21 of the central region 32*a* corresponds to the difference between the dimension between the geometric center C2 of the second soft magnetic metal particle 32 and its surface and the width d22 of the surface region 32*b*.

As mentioned above, the second soft magnetic metal particle 32 differs from the first soft magnetic metal particle 31 in that it does not contain the Si—O precipitate. In one embodiment, the particle size of the second soft magnetic metal particles 32 is larger than the particle size of the first magnetic metal particles 31. For example, the average particle diameter of the second soft magnetic metal particle 32 is larger than that of the first soft magnetic metal particle 31 in an observed field of view of a section of the base body 10 (e.g., when observed at 10,000-fold magnification).

The composition of the second soft magnetic metal particle 32 may be the same as that of the first soft magnetic metal particle 31, except for the Si—O precipitate. The second soft magnetic metal particle 32 contains 95 at % or more of Fe in the central region 32*a*. The second soft magnetic metal particle 32 may contain 97 at % or more of Fe in the central region 32*a* as in the first soft magnetic metal particle 31. The Fe content ratio in the central region 32*a* may be 97 at % or greater, 98 at % or greater, or 99 at % or greater. The second soft magnetic metal particle 32 may contain Si in addition to Fe in the central region 32*a*. The Si content ratio in the central region 32*a* may be between 0.01 at % and 1.0 at %, both inclusive. The central region 32*a* may not contain Al. The central region 32*a* may contain Cr in a smaller atomic proportion than Si. The central region 32*a* may contain Al in a smaller proportion than Si. The central region 32*a* may contain Cr and Al. The central region 32*a* may not contain Cr. The central region 32*a* may not contain Al. The central region 32*a* may not contain any element A. To determine whether the element A is included in the central region 32*a* or not, the EDS analysis is performed on the SEM image of the section of the second soft magnetic metal particle 32 to obtain mapping data of the element A, and when there is any position in the central region 32*a* that shows a peak intensity of the element A above the detection limit in this mapping data, it can be determined that the element A is included in the central region 32*a*. Whereas when the peak intensity of the element A is below the detection limit in all areas of the central region 32*a*, it is determined that the central region 32*a* does not contain the element A. Similar to the determination of Si, a count value of three times the standard deviation a of the background level, i.e., three times the square root of the background level, is the detection limit for the element A. The atomic proportion of Si contained in the surface region 32*b* is higher than the atomic proportion of Si contained in the central region 32*a*.

The oxide film 42 covers the surface region 32*b* of the second soft magnetic metal particle 32. Similar to the oxide film 41, the oxide film 42 may contain a highly insulating oxide. The oxide film 42 includes oxides of Si and oxides of the element A (oxides of Cr and/or Al). The oxide film 42 may contain oxides of Fe. The oxide film 42 preferably covers the entire surface region 32*b* of the second soft magnetic metal particle 32. The oxide film 42 preferably has a thickness (radial dimension) of 5 nm or more.

Figure 7:
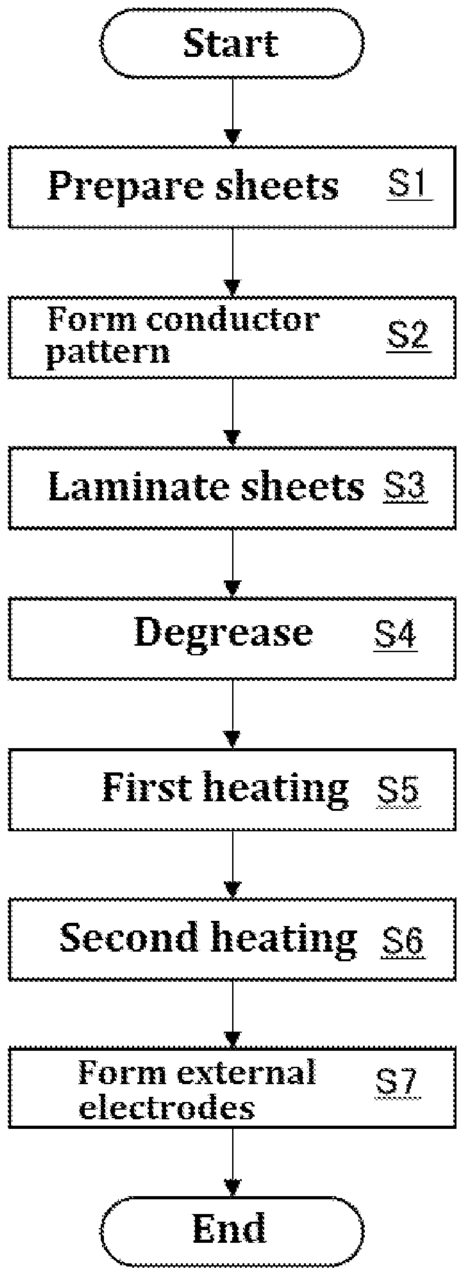
FIG. 7 is a flow chart showing a process of manufacturing a coil component according to one embodiment of the present invention.

Next, one example of a manufacturing method of the coil component 1 will be described with reference to FIG. 7. Since the manufacturing process of the coil component 1 includes the manufacturing process of the base body 10, the manufacturing method of the base body 10 will also be described with reference to FIG. 7. FIG. 7 is a flowchart showing a manufacturing method of the coil component 1 according to one embodiment of the present invention. In the following, it is assumed that the coil component 1 is manufactured by the sheet lamination method. The coil component 1 may also be manufactured by any known methods other than the sheet lamination method. For example, the coil component 1 may be manufactured by a printing lamination method, a thin-film process method, a slurry build method, or the like.

In the first step S1, magnetic sheets are fabricated. The magnetic sheets are produced from a magnetic material paste which is obtained by mixing and kneading soft magnetic metal powder, which is the raw material powder for the first and second soft magnetic metal particles 31 and 32, with a binder resin and a solvent. The first and second soft magnetic metal particles 31 and 32 can be produced from the same raw material powder. The soft magnetic metal powder contains Fe, Si, and the element A. In the soft magnetic metal powder, Fe, Si and the element A are almost uniformly distributed. The proportion of Fe in the raw powder is different from the proportion of Fe after the heat treatment.

The binder resin for the magnetic material paste is, for example, an acrylic resin. The binder resin for the magnetic material paste may be epoxy resins, polyimide resins, resins known as binder resins other than those mentioned above, or mixtures thereof. One example of the solvent is toluene. The magnetic material paste is applied to the surface of a plastic base film by the doctor blade method or other common methods. The magnetic material paste applied to the surface of the base film is dried to obtain sheet-shaped molded bodies. A molding pressure of approximately 10 Mpa to 100 Mpa is applied to the sheet-shaped molded bodies in the mold, so that a plurality of magnetic sheets are obtained.

Next, in step S2, a conductive paste is applied to some of the plurality of magnetic sheets prepared in step S1. The conductive paste is produced by kneading conductive powder formed of a conductive material with excellent conductivity, such as Ag, Pd, Cu, Al, or their alloys, with a binder resin and solvent. The binder resin for the conductive paste may be the same type of resin as the binder resin for the magnetic material paste. Both the binder resins for the conductive paste and magnetic material paste may be acrylic resins.

By applying the conductive paste on the magnetic sheets, unfired conductor patterns, which will become the conductor patterns C11 to C16 after firing, are formed on the associated magnetic sheets. A through hole penetrating the sheet in the stacking direction may be formed in a part of the magnetic sheets. When the conductive paste is applied to the magnetic sheet with the through hole(s), the conductive paste also fills the through hole(s). In this way, unfired vias, which turn to the vias V1 to VS after firing, are formed to form the vias V1 to VS. The conductive paste is applied to the magnetic sheets by, for example, screen printing.

Next, in step S3, the magnetic sheets prepared in step S1 are stacked together to form a top laminate to be the top cover layer 18, an intermediate laminate, and a bottom laminate to be the bottom cover layer 19. The top laminate and the bottom laminate are each formed by stacking four magnetic sheets prepared in step S1 and having no unfired conductor pattern formed thereon. The four magnetic sheets of the top laminate will be the magnetic films 18*a* to 18*d* respectively in the finished coil component 1, and the four magnetic sheets of the bottom laminate will be the magnetic films 19*a* to 19*d* respectively in the finished coil component 1. The intermediate laminate is formed by stacking seven magnetic sheets each having an unfired conductor pattern formed thereon in a predetermined order. The seven magnetic sheets of the intermediate laminate will be the magnetic films 11 to 17 respectively in the finished coil component 1. The intermediate laminate formed in the above-described manner is sandwiched between the top laminate on the top side and the bottom laminate on the bottom side, and the top laminate and the bottom laminate are bonded to the intermediate laminate by thermal compression to obtain a body laminate. Next, the body laminate is diced to a desired size by using a cutter such as a dicing machine or a laser processing machine to make a chip laminate. The chip laminate is an example of a molded body that includes a substrate body to be the base body 10 after the heat treatment and unfired conductor patterns to be the coil conductor 25 after the heat treatment. The molded body that includes the substrate body to be the base body 10 after the heat treatment and the unfired conductor patterns to be the coil conductor 25 after the heat treatment may be fabricated by a method other than the sheet lamination method.

Next, in step S4, the molded body made in step S3 is degreased. When a pyrolytic resin is used as the binder resin for the magnetic and conductive pastes, the degreasing treatment can be performed under a non-oxygen atmosphere such as a nitrogen atmosphere. By conducting the degreasing treatment under the non-oxygen atmosphere, oxidation of Fe contained in the soft magnetic metal powder can be prevented during the degreasing treatment. The degreasing treatment is performed at a temperature higher than the thermal decomposition start temperature of the binder resin for the magnetic material paste. When an acrylic resin is used as the binder resin for the magnetic material paste, degreasing is performed at a temperature higher than the thermal decomposition start temperature of the acrylic resin, for example, 300° C. to 500° C. Since the degreasing treatment decomposes the pyrolytic resin in the molded body, no pyrolytic resin remains in the molded body after the degreasing treatment is completed. When the degreasing treatment is performed in the temperature range of 300° C. to 500° C., migration of elements (e.g., Si and the element A) by thermal diffusion hardly occurs in the soft magnetic metal powder. By using the same pyrolytic resin for the binder resin of the conductive paste and for the binder resin of the magnetic material paste, the pyrolytic resin contained in the unfired conductor pattern is also pyrolyzed during the degreasing treatment in step S4. Thus, in step S4, both the magnetic material sheet and the unfired conductor pattern that constitute the molded body are degreased.

Next, in step S5, a first heat treatment is performed on the degreased molded body. The first heat treatment is performed at the first temperature in a reducing atmosphere such as hydrogen gas diluted with nitrogen. The hydrogen concentration of the reducing atmosphere in the first heat treatment is, for example, to 4.0%. The first temperature can be between 600° C. and 800° C. By heating the soft magnetic metal powder at 600° C. to 900° C., Si and the element A migrate to near the surface in each particle of the soft magnetic metal powder by thermal diffusion. Since the first heat treatment is performed in the reducing atmosphere, the elements in the soft magnetic metal powder are not oxidized during the first heat treatment. A first heating time of the first heat treatment may be between 1 and 6 hours. The first heating time is, for example, 1 hour. In Fe-based soft magnetic metal powder having an average particle size of 1 μm to 50 μm, heating the powder at a temperature of 600° C. or higher for 1 hour or longer allows the additive elements such as Si, Cr, and Al to migrate to near the surface of each particle of the soft magnetic metal powder.

Next, in step S6, a second heat treatment is performed in the atmosphere on the molded body that has been heated in the first heat treatment. Since the second heat treatment is performed in the atmosphere, the elements in the soft magnetic metal powder are oxidized during the second heat treatment. Since the element(s) A (Cr and/or Al) and Si have migrated to near the surfaces of the particles of the soft magnetic metal powder in the first heat treatment, an oxide film containing oxides of these elements is formed on the surfaces of the particles of the soft magnetic metal powder in the second heat treatment. In addition, oxygen penetrates into the interior of some of the soft magnetic metal powder particles, and the oxygen that has penetrated into the interior combines with Si in a region slightly on the inner side from the surface of the soft magnetic metal powder particles to form the Si—O precipitates 50. Through this second heat treatment, some of the soft magnetic metal powder particles become the first soft magnetic metal particles 31 that each have the oxide film 41 on the surface and the Si—O precipitates 50 near the surface, and the rest of the soft magnetic metal powder particles become the second soft magnetic metal particles 32 that each have the oxide film 42 on the surface. As mentioned above, the second soft magnetic metal particles 32 do not contain the Si—O precipitates 50. When the first soft magnetic metal particles 31 are adjacent to each other, the oxide films 41 on their respective surfaces bond with each other. When the first soft magnetic metal particle 31 and the second soft magnetic metal particle 32 are adjacent to each other, the oxide film 41 of the first soft magnetic metal particle 31 and the oxide film 42 of the second soft magnetic metal particle 32 bond with each other.

During the second heat treatment, in addition to oxidation of the soft magnetic metal powder, sintering of the conductive powder in the unsintered conductor patterns also occurs. The coil conductor 25 is obtained by sintering the conductive powder in the unsintered conductor patterns. When copper powder is used as the conductive powder, the copper crystals sinter densely to form the coil conductor 25.

The second heat treatment is performed at a second heating temperature and for a second heating time. The second heating temperature and the second heating time are determined such that an oxide film with sufficient thickness enough to ensure insulation is formed on the surface of the soft magnetic metal powder particle, and such that between 1% and 10% of the soft magnetic metal powder contained in the molded body becomes the first soft magnetic metal particles 31 and the remainder becomes the second soft magnetic metal particles 32. The second heating temperature may preferably be the temperature at which grain growth of the conductive powder in the conductive paste becomes possible. When the conductive powder is made of Cu or Ag, crystal grain can grow in the conductive powder at 600° C. or higher. In this respect, the second heating temperature may be, for example, between 600° C. and 700° C. The higher the second heating temperature, the faster the oxidation progresses, so the second heating time depends on the second heating temperature. When the second heating temperature is 600° C., the second heating time may be from one to six hours. When the second heating temperature is 700° C., the second heating time may be from 30 minutes to one hour.

As described above, the coil conductor 25 is produced from the unsintered conductor pattern through the second heat treatment process. The second heat treatment also oxidizes the soft magnetic metal powder contained in the molded body to produce the first soft magnetic metal particles 31 or second soft magnetic metal particles 32, resulting in the base body 10 in which the first soft magnetic metal particles 31 and second soft magnetic metal particles 32 are bound to each other. In this way, the molded body having the coil conductor 25 provided in the base body 10 is obtained.

Next, in step S7, the external electrode 21 and the external electrode 22 are formed on the surface of the molded body obtained in step S5. The external electrode 21 is connected to one end of the coil conductor 25, and the external electrode 22 is connected to the other end of the coil conductor 25. The molded body after the second heat treatment may be impregnated with a resin before the external electrodes 21 and 22 are formed. The molded body is impregnated with, for example, a thermosetting resin such as an epoxy resin. This allows the resin to penetrate the gaps between the soft magnetic metal particles 31 in the base body 10. The resin that has penetrated into the base body 10 may be set to increase the mechanical strength of the base body 10.

The coil component 1 is obtained through the above steps.

Figure 8:
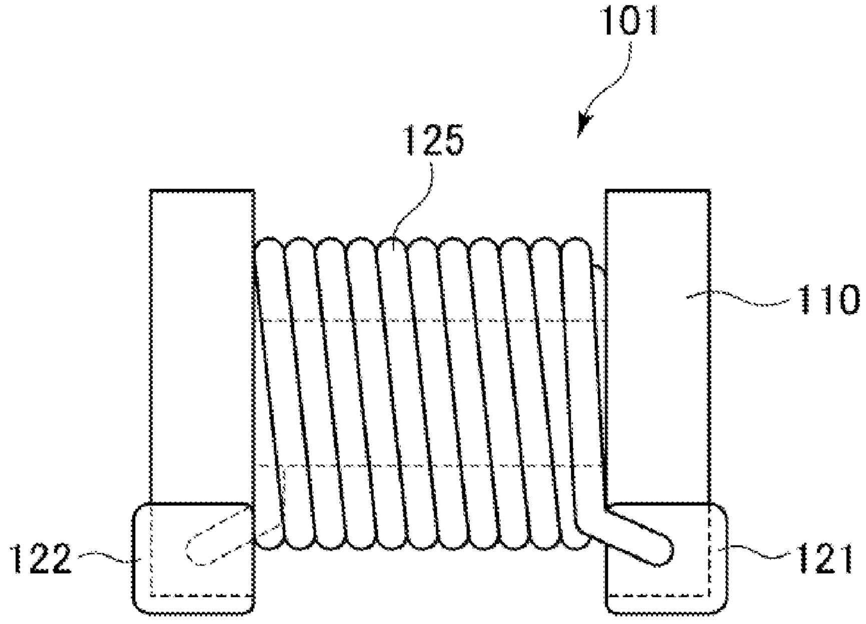
FIG. 8 is a front view showing a coil element according to another embodiment of the disclosure.

Next, with reference to FIG. 8, a description is given of a coil component 101 according to another embodiment. FIG. 8 is a front view showing a coil component 101 according to another embodiment of the disclosure.

Figure 9:
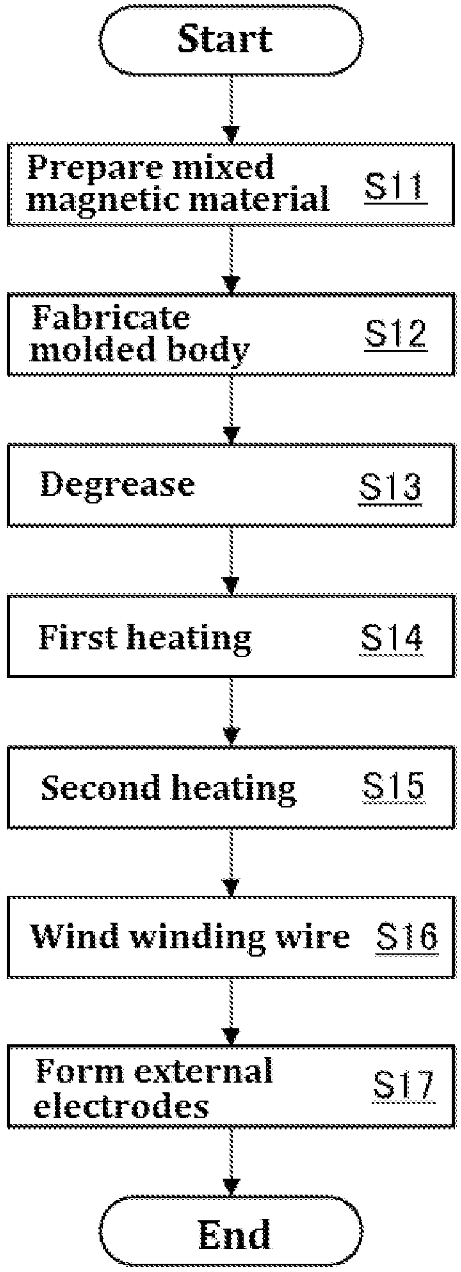
FIG. 9 is a flow chart showing a process of manufacturing a coil component according to another embodiment of the disclosure.
Figure 10:
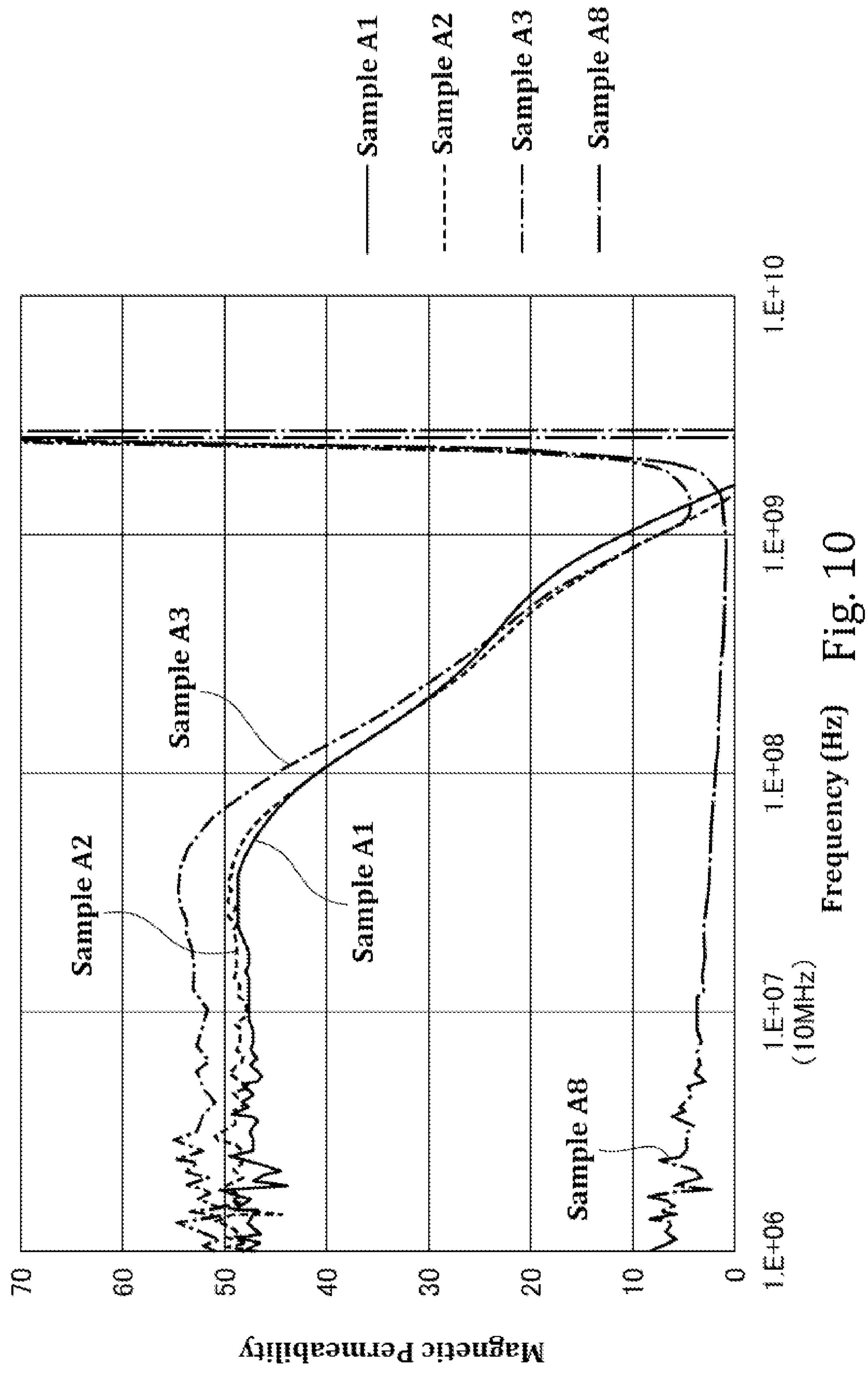
FIG. 10 is a graph showing a frequency characteristics of magnetic permeability for the embodiments and comparative examples.

As shown in FIGS. 9 and 10, the electronic component 101 includes a base body 110, a winding wire 125 wound around a winding core of the base body 110, an external electrode 121, and an external electrode 122. The winding wire 125 is one example of the coil conductor. The external electrode 121 is provided on one flange of the base body 110, and the terminal electrodes 122 is provided on the other flange of the base body 110. The winding wire 125 is configured such that one end is electrically connected to the external electrode 121 and the other end is electrically connected to the external electrode 122.

The base body 110 includes a plurality of soft magnetic metal particles, similarly to the base body 10. The soft magnetic metal particles in the base body 110 include first soft magnetic metal particles 31 and second soft magnetic metal particles 32. The first soft magnetic metal particles 31 include Si—O precipitates containing Si and O, while the second soft magnetic metal particle 32 does not include the Si—O precipitates. The description of the base body 10 in the specification also applies to the base body 110 unless otherwise construed.

Next, one example of the manufacturing method of the coil component 101 using compression molding will be described with reference to FIG. 9.

When the coil component 101 is manufactured by a compression molding method, first, in step S11, the soft magnetic metal powder (raw material powder), which is the raw material for the first soft magnetic metal particles 31 and the second soft magnetic metal particles 32, is mixed with a binder resin and a solvent to produce a mixed magnetic material. The mixed magnetic material may be in the form of paste or granulated magnetic powder.

Next, in step S12, the mixed magnetic material prepared in step S11 is put into the mold and compressed therein to obtain a molded body.

Next, in step S13, the molded body obtained in step S12 is degreased. The degreasing in step 13 is performed in the same manner as the degreasing in step S4 of the lamination method.

In step S14, the molded body degreased in the step S13 is subjected to the first heat treatment. The first heat treatment performed in the step S14 can be performed under the same conditions as the first heat treatment performed in the step S5 of the lamination method.

In following step S15, the molded body subjected to the first heat treatment in the step S14 is subjected to the second heat treatment. The second heat treatment performed in the step S15 can be performed under the same conditions as the second heat treatment performed in the step S6 of the lamination method. The second heat treatment produces the base body 110 from the molded body.

Next, in step S16, the winding wire 125 is wound around the winding core of the base body 110 obtained in step S15.

In step S17, the external electrodes 121 and 122 are formed on the base body 110. Both ends of the winding wire 125 wound around the base body 110 in step S16 are connected to the corresponding external electrodes. As described above, the coil component 101 having the base body 110 made by the compression molding method is fabricated.

The base body 10 according to one embodiment includes the plurality of first soft magnetic metal particles 31 that contain the plurality of Si—O precipitates 50 including Si and O in the surface region 31*b* and the plurality of second soft magnetic metal particles 32 that do not contain Si—O precipitates. The first soft magnetic metal particle 31 contains a higher atomic proportion of Si in its surface region 31*b* than in its central region 31*a*. Similarly, the second soft magnetic metal particle 32 contain a higher atomic proportion of Si in its surface region 32*b* than in its central region 32*a*.

During the second heat treatment, oxygen that enters the interior (inside the oxide film 41) of the raw material powder particle that becomes the first soft magnetic metal particle 31 combines with Si in the surface region 31*b* to form the Si—O precipitate 50. Therefore, the first soft magnetic metal particle 31 contains the Si—O precipitates 50 in the surface region 31*b*. As described above, during the second heat treatment, the oxygen that penetrates into the interior of the raw powder material particles is captured by the Si omnipresent in the surface region 31*b*, and the oxidation of Fe in the central region 31*a* is inhibited.

The inventor has noticed that the raw material powder of the soft magnetic metal particles contains easily oxidized particles, which allow oxygen to penetrate easily into the interior, and difficult-to-oxidize particles, which do not allow oxygen to penetrate easily into the interior, in the mixed state. For example, the raw powder particles with a relatively small particle diameter have a larger specific surface area than those with a relatively large particle diameter. As described above, Si and the element A migrate to the surface of each soft magnetic powder particle by thermal diffusion in the first heat treatment. The amount of Si and the element A per surface area is smaller in the powder with a relatively small particle diameter than in the powder with a relatively large particle diameter, and thus oxygen easily penetrates into the powder with a relatively small particle diameter. Therefore, oxygen more easily penetrate into the interior of the raw material powder particles with relatively small particle diameters than those with relatively large particle diameters. In addition, during the manufacturing process of the magnetic base body (e.g., during compression molding to produce the magnetic sheets), some of the raw material powder particles may be subjected to relatively large strain. Oxygen tends to penetrate into the interior of the raw material powder particles that are largely deformed. When a oxide film with sufficient thickness containing Si and the element A is formed on the surfaces of the raw material powder particles, it becomes difficult for oxygen to penetrate into the interior of the particles. The oxide film is formed during the second heat treatment, but if the ratio of Fe in the raw material powder is very high, for example, 95 at % or more, the amount of Si and the element A required to form the oxide film becomes small, making it difficult to form the oxide film having a sufficient thickness. If the oxide film having a sufficient thickness is not formed on the surfaces of some of the raw material powder particles, the raw material powder is easily oxidized since oxygen can easily penetrate into the interior of the particles.

In raw material powder consisting of multiple crystal grains, oxygen may penetrate into the interior of the particles along the grain boundary, which is the boundary between multiple crystal grains, during the second heat treatment. In the vicinity of the grain boundary of crystal grains (region corresponding to the grain boundary region 31*c*), there may be Si on the way to thermal diffusion to the surface region 31*b*. Oxygen entered in the grain boundary of the crystal grains combines with Si near the grain boundary, and Si—O precipitates precipitate in the grain boundary region 31*c*. Therefore, the first soft magnetic metal particle 31 can contain the Si—O precipitates in the grain boundary region 31*c* in addition to the surface region 31*b*. Thus, in the second heat treatment, oxygen that entered the interior from the surface of the raw material powder particle is captured by Si omnipresent in the surface region 31*b*, and oxygen that entered the interior from the grain boundary is captured by Si near the grain boundary, thereby inhibiting Fe oxidation in the central region 31*a*.

When excessive oxygen penetrates into the interior of the raw material powder particles during the second heat treatment, all of the Si present in the surface region 31*b* combines with the oxygen, and the oxygen goes beyond the surface region 31*b* to the central region 31*a*. The oxygen that has reached to the central region 31*a* oxidizes Fe present in the central region 31*a*. Therefore, if excessive oxygen penetrates into the interior of the raw material powder, the magnetic properties (magnetic permeability) of the base body 10 deteriorate. Whether excessive oxygen has penetrated into the interior of the raw material powder particle can be determined by what percentage of the soft magnetic metal particles in the base body are precipitated with the Si—O precipitates 50 (i.e., determined based on the Si—O precipitation ratio). For example, when the Si—O precipitates 50 are precipitated in 1% to 10% of the soft magnetic metal particles contained in the base body 10 (i.e., when the Si—O precipitation ratio is in the range of 1% to 10%), it can be determined that an appropriate amount of oxygen has penetrated into the raw material powder particles. When the Si—O precipitation ratio exceeds 10%, oxygen penetrates into some of the difficult-to-oxidize particles, so excessive oxygen penetrates into the easily-oxidized particles and oxygen reaches the central region 31*a* as well. Whereas when the Si—O precipitation ratio is less than 1%, oxidation of the raw material powder may be insufficient, and the oxide film 41 may not be formed thick enough for electrical insulation between the soft magnetic metal particles, resulting in degradation of the insulation performance of the base body 10. As described above, by performing the second heat treatment under conditions where the Si—O precipitates 50 are formed in the easily-oxidized particles while the Si—O precipitates are not formed in the difficult-to-oxidize particles (specifically, the Si—O precipitation ratio is in the range of 1% to 10%), it is possible to prevent excessive oxygen penetration into the central regions of the easily-oxidized particles, and oxidation of Fe in the central regions 31*a* can be inhibited. In this case, the penetration of excessive oxygen into the central regions of the difficult-to-oxidize particles is also suppressed. Thus, a high Fe content ratio can be achieved in each of the soft magnetic metal particles in the base body 10.

Since oxygen penetrates into the easily-oxidized particles during the manufacturing process of the coil components 1 and 101, oxidation of the additive elements is sufficiently advanced on the surface of each raw material powder particle. Therefore, the oxide films 41 and 42 having the thickness necessary to ensure insulation can be formed on the surface of each soft magnetic metal particle.

Furthermore, the Si—O precipitates 50 have a lower magnetic permeability than Fe and thus function as a magnetic gap in the magnetic base body. In the above embodiment, since the surface region 31*b* of the first soft magnetic metal particle 31 has the Si—O precipitates 50, these Si—O precipitates 50 function as the magnetic gap to improve the DC bias characteristics of the coil components 1 and 101. When the first soft magnetic metal particle 31 has the Si—O precipitates 50 in both the surface region 31*b* and the grain boundary region 31*c*, the area that functions as the magnetic gap increases, which further improves the DC bias characteristics of the coil components 1 and 101.

EXAMPLES

According to steps S1 to S3 above, 10 unheated chip laminates were produced as follows. First, Fe-based soft magnetic metal powder (raw material powder) with an average particle diameter of 4 μm was prepared. The composition ratios of the soft magnetic metal powder expressed in weights were Fe: 97.5 wt %, Si: 2 wt %, and Cr: 0.5%. The raw material powder was mixed and kneaded with an acrylic resin and a solvent to make a resin mixture composition. The resin mixture composition was applied onto a PET film using the doctor blade method, and dried to cause the solvent to volatilize. In this manner, a sheet-shaped resin molded body was obtained. A plurality of sheet-shaped resin molded bodies were stacked on top of each other, to obtain a laminate. Subsequently, the laminate was placed in the mold and pressurized therein at a pressure of 7 tons/$cm^2$ to obtain a sheet-shaped compression-molded body with a thickness of 0.5 mm. The compression-molded body was then punched into a toroidal shape with an outer diameter of 10 mm, an inner diameter of 10 mm, and a thickness of 0.55 mm. The sheet-shaped compression-molded body was diced to produce chip-shaped elements, each of which has a length of 1.6 mm, a width of 0.8 mm, and a height of 0.5 mm.

Each of these toroidally punched and chip-shaped elements was subjected to the degreasing, first heat treatment, and second heat treatment under the conditions shown in Table 1 according to steps S4 to S6 above to obtain toroidal-shaped samples A1 to A11 and chip-shaped samples B1 to B11. For example, the sample A1 and sample B1 are the samples prepared under the conditions shown in the sample number 1 (No. 1) entry in Table 1. The sample A2 . . . sample A11 and the sample B2 . . . sample B11 are likewise samples prepared under the conditions indicated in the entry for Sample No. 2 . . . Sample No. 11 (No. 2 to No. 11) in Table 1, respectively.

TABLE 1

| Sample Number | Degreasing Atmosphere | Degreasing Heating Temprature | First Heat Treatment Atmosphere | First Heat Treatment Heating Temprature | First Heat Treatment Heating Time | Second Heat Treatment Atmosphere | Second Heat Treatment Heating Temprature | Second Heat Treatment Heating Time |
|---|---|---|---|---|---|---|---|---|
| No1. (Example) | Nitrogen | 400° C. | 4%$H_2$—$N_2$ | 700° C. | 1 h | Air | 700° C. | 1 h |
| No2. (Example) | Nitrogen | 400° C. | 0.5%$H_2$—$N_2$ | 700° C. | 1 h | Air | 700° C. | 1 h |
| No3. (Example) | Nitrogen | 400° C. | 4%$H_2$—$N_2$ | 700° C. | 1 h | Air | 600° C. | 1 h |
| No4. (Example) | Nitrogen | 400° C. | 4%$H_2$—$N_2$ | 700° C. | 1 h | Air | 650° C. | 1 h |
| No5. (Example) | Nitrogen | 400° C. | 4%$H_2$—$N_2$ | 700° C. | 1 h | Air | 600° C. | 0.5 h |
| No6. (Example) | Nitrogen | 400° C. | 4%$H_2$—$N_2$ | 700° C. | 1 h | Air | 700° C. | 0.5 h |
| No7. (Example) | Nitrogen | 400° C. | 4%$H_2$—$N_2$ | 700° C. | 1 h | Air | 600° C. | 6 h |
| No8. (Comparative Ex.) | Nitrogen | 400° C. | 4%$H_2$—$N_2$ | 700° C. | 1 h | Air | 800° C. | 1 h |
| No9. (Comparative Ex.) | Nitrogen | 400° C. | 4%$H_2$—$N_2$ | 700° C. | 1 h | Air | 750° C. | 1 h |
| No10. (Comparative Ex.) | Nitrogen | 400° C. | 4%$H_2$—$N_2$ | 700° C. | 1 h | Air | 700° C. | 2 h |
| No11. (Comparative Ex.) | Nitrogen | 400° C. | 4%$H_2$—$N_2$ | 700° C. | 1 h | Air | 600° C. | 8 h |

The magnetic permeability of each of the samples A1 to A11 prepared as described above was measured at frequencies between 1 MHz and 1 GHz using material analyzer E4991A available from Agilent. FIG. 10 shows the measurement results of the frequency characteristics of the magnetic permeability for the samples A1 to A3 and sample A8. In the graph of FIG. 10, the horizontal axis referring to the frequency and the vertical axis referring to the magnetic permeability. Since the coil component 1 is expected to be used at around 10 MHz, for example, FIG. 10 shows assumed results of the magnetic permeability in the region above 1 MHz. As shown in FIG. 10, in the samples Al to A3, the limit of the Snoek is greater than 10 MHz and about 100 MHz. Although not shown in the figure, the Snoek limit is also about 100 MHz for the samples A4 to A7. For the sample A8, the Snoek limit is smaller than 1 MHz, and in the frequency range shown in FIG. 10, the magnetic permeability is already decreased to a value smaller than 10. For the samples A9 to A11, similarly to the sample A8, the Snoek limit of the snake is smaller than 1 MHz, and the magnetic permeability around 10 MHz is smaller than 10. The shift of the Snoek limit to the low frequency region (below 1 MHz) in the samples A8-A11 may be caused by excessive thermal diffusion and oxidation in the soft magnetic metal particles, resulting in the precipitation of the oxide film on the surface of the soft magnetic metal particles into voids between the soft magnetic metal particles, which resulting in insufficient insulation between the soft magnetic metal particles.

Each of the samples B1-B11 was embedded in epoxy resin, and the surface of each of the samples B1-B11 embedded in the epoxy resin was polished. Os-coating was formed in a thickness of 5 nm on this polished surface. SEM images of the polished surfaces of the Os-coated samples B1 to B11 were taken at 5000× magnification. The image of the polished surface of each of the samples B1 to B11 was taken using a scanning electron microscope SU7000 manufactured by Hitachi High-Tech Corporation by irradiating an electron beam at an acceleration voltage of 5 kV to each polished surface. SEM-EDS analysis was performed on each of the polished surfaces of the samples B1 to B11 to obtain distribution images of Si, Cr, and O elements. The EDS analysis was performed using an Octane Elite energy dispersive X-ray spectroscopy detector manufactured by Ametek, Inc.

For the SEM images of the samples B1 to B7, it was confirmed that an oxide film was formed on the surface of each soft magnetic metal particle in the observation field. Specifically, in each soft magnetic metal particle, it was confirmed that there was a thin layer on the surface that was different in brightness from the interior. In addition, the EDS analysis was performed on the SEM images to obtain distribution images of Cr, Si, and O. It was confirmed from the distribution images that Si, Cr, and O were distributed in a layer on the surface of each soft magnetic metal particle. It was confirmed that the oxide film including Si oxide and Cr oxide were formed on the surface of each soft magnetic metal particle in the samples B1 to B7. Whereas, in the SEM images of the samples B8 to B11, there was no layer of oxide film covering the surfaces of the soft magnetic metal particles in the observation field of view. The reason why the oxide film covering the soft magnetic metal particle was not confirmed in the samples B8 to B11 is thought to be because the oxide film once formed on the surfaces of the soft magnetic metal particles diffused into the gaps between the soft magnetic metal particles due to the high heating temperature and/or the long heating time. The fact that the oxide film was not confirmed in the samples B8 to B11 is consistent with a low insulation performance of the samples A8 to A11 (the Snoek limit is shifted to the low frequency side below 1 MHz).

For each of the samples B1 to B11, the areas where Si—O precipitates were present were identified from the mixing map of the Si and O elements, and the Si—O precipitation ratio was determined. The results for each sample are as follows.

Sample B1

There were 372 soft magnetic metal particles in the observation field of view, and the Si—O precipitates were present in 16 of those soft magnetic metal particles. Thus, the Si—O precipitation ratio in the observed field of view was about 4%.

Sample B2

There were 360 soft magnetic metal particles in the observation field of view, and the Si—O precipitates were present in 32 of those soft magnetic metal particles. Thus, the Si—O precipitation ratio in the observed field of view was about 9%.

Sample B3

There were 412 soft magnetic metal particles in the observation field of view, and the Si—O precipitates were present in 8 of those soft magnetic metal particles. Thus, the Si—O precipitation ratio in the observed field of view was about 2%.

Sample B4

There were 407 soft magnetic metal particles in the observation field of view, and the Si—O precipitates were present in 9 of those soft magnetic metal particles. Thus, the Si—O precipitation ratio in the observed field of view was about 2%.

Sample B5

There were 397 soft magnetic metal particles in the observation field of view, and the Si—O precipitates were present in 4 of those soft magnetic metal particles. Thus, the Si—O precipitation ratio in the observed field of view was about 1%.

Sample B6

There were 420 soft magnetic metal particles in the observation field of view, and the Si—O precipitates were present in 10 of those soft magnetic metal particles. Thus, the Si—O precipitation ratio in the observed field of view was about 2%.

Sample B7

There were 388 soft magnetic metal particles in the observation field of view, and the Si—O precipitates were present in 21 of those soft magnetic metal particles. Thus, the Si—O precipitation ratio in the observed field of view was about 5%.

Sample B8

There were 363 soft magnetic metal particles in the observation field of view, and the Si—O precipitates were present in 352 of those soft magnetic metal particles. Thus, the Si—O precipitation ratio in the observed field of view was about 97%.

Sample B9

There were 349 soft magnetic metal particles in the observation field of view, and the Si—O precipitates were present in 101 of those soft magnetic metal particles. Thus, the Si—O precipitation ratio in the observed field of view was about 29%.

Sample B10

There were 389 soft magnetic metal particles in the observation field of view, and the Si—O precipitates were present in 72 of those soft magnetic metal particles. Thus, the Si—O precipitation ratio in the observed field of view was about 19%.

Sample B11

There were 351 soft magnetic metal particles in the observation field of view, and the Si—O precipitates were present in 83 of those soft magnetic metal particles. Thus, the Si—O precipitation ratio in the observed field of view was about 24%.

In the samples B1 to B7, the Si—O precipitates were present locally within 0.4 μm from the surface (interface with the oxide film) of each soft magnetic metal particle (corresponding to the surface region 31*b*). In the samples B1, B2, and B7, the Si—O precipitates in some soft magnetic metal particles were present locally within 0.4 μm from the surface (interface with the oxide film) of each soft magnetic metal particle (corresponding to the surface region 31*b*), and present locally within 0.4 μm from the grain boundary of each crystal grain (corresponding to the grain boundary region 31*c*). In the samples B8 to B11, the Si—O precipitates were omnipresent in the central region 31*a*, not only in the grain boundary region 31*c* but also in the grain inner region 31*d*. The presence of the Si—O precipitates in the central region 31*a* (or in the grain inner region 31*d* if the soft magnetic metal particle has crystal grains) indicates that in the samples B8 to B11, oxygen penetrates into the central region 31*a* (or in the grain inner region 31*d* if the soft magnetic metal particle has crystal grains) through the surface region 31*b* and the grain boundary region 31*c*.

For the samples B1 to B7, the content ratio of Fe in the region corresponding to the central region 31*a* of the soft magnetic metal particle was quantified by an energy-dispersive X-ray spectroscopic detector. Specifically, for the soft magnetic metal particles in which the Si—O precipitates 50 are contained in the surface region 31*b* but not in the central region 31*a*, as shown in FIG. 5A, the content ratio of Fe in the central region 31*a* was measured by an energy dispersive X-ray spectroscopic detector. For the soft magnetic metal particles in which the Si—O precipitates 50 are contained in the surface region 31*b* and grain boundary region 31*c*, as shown in FIG. 5B, the content ratio of Fe in the inner grain region 31*d* was quantified by an energy dispersive X-ray spectroscopic detector. Obtained results of the Fe content ratio in the central region 31*a* or the inner grain region of the soft magnetic metal particles in the samples B1 to B7 were 99.5%, 98.2%, 97.8%, 99.1%, 97.0%, 98.5%, and 98.8%, respectively.

The above results show that the higher the heating temperature and the longer the heating time in the second heat treatment, the more easily the elements in the soft magnetic metal particles are oxidized, and as a result, the more easily Si—O precipitates are precipitated (i.e., the Si—O precipitation ratio increases). And from the frequency characteristics of the magnetic permeability measured for the samples Al to A7, it can be seen that by setting the Si—O precipitation ratio in the range of 1% to 10%, it is possible to ensure a high insulation performance between the soft magnetic metal particles in the base body 10 and maintain a high magnetic permeability even at 10 MHz. In addition, the Fe content ratio in the central region 31*a* in the samples B1 to B7 was 97 at % or higher, indicating that a high Fe content ratio can be achieved when the Si—O precipitation ratio is in the range of 1% to 10%.

Experiments were performed under the same conditions as above using Al instead of Cr. The same experimental results as in the samples A1-A11 and B1-1311 were obtained when Al was used instead of Cr.

One or more of the steps of the manufacturing method described herein can be omitted as appropriate. In the manufacturing method of the coil component 1, steps not described explicitly in this specification may be performed as necessary. A part of the steps included in the manufacturing method of the coil component 1 may be performed in different order within the purport of the present invention. A part of the steps included in the manufacturing method of the coil component 1 may be performed at the same time or in parallel, if possible.

The dimensions, materials, and arrangements of the constituent elements described for the above various embodiments are not limited to those explicitly described for the embodiments, and these constituent elements can be modified to have any dimensions, materials, and arrangements within the scope of the present invention.

Furthermore, constituent elements not explicitly described herein can also be added to the above-described embodiments, and it is also possible to omit some of the constituent elements described for the embodiments.

The words "first," "second," "third" and so on used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

This specification also discloses the following embodiments.

Additional Embodiment 1

A coil component comprising:

a magnetic base body including a plurality of soft magnetic metal particles containing Fe and Si, and an oxide film provided on a surface of each of the plurality of soft magnetic metal particles and containing an oxide of Si and an oxide of element A (wherein the element A is at least one element selected from the group consisting of Cr and Al); and a coil conductor provided in the magnetic base body, wherein each of the soft magnetic metal particles is divided into a central region and a surface region extending along the surface of the soft magnetic metal particle on a radially outward side from the central region and containing a higher atomic proportion of Si than the central region, wherein the plurality of soft magnetic metal particles includes a plurality of first soft magnetic metal particles, the plurality of first soft magnetic metal particles including a plurality of Si—O precipitates containing Si and O in said surface region, the plurality of Si—O precipitates are separated from each other.

Additional Embodiment 2

The coil component of Additional Embodiment 1, wherein the plurality of soft magnetic metal particles includes a plurality of second soft magnetic metal particles, and each of the plurality of second soft magnetic metal particles includes no Si—O precipitates.

Additional Embodiment 3

The coil component of Additional Embodiment 1 or 2, wherein at least one of the plurality of first soft magnetic metal particles has a plurality of crystal grains and also contains the Si—O precipitates in a grain boundary region near a grain boundary of the plurality of crystal grains.

Additional Embodiment 4

The coil component of any one of Additional Embodiments 1 to 3, wherein each of the plurality of soft magnetic metal particles contains 95 at % or more of Fe in the central region.

Additional Embodiment 5

The coil component of any one of Additional Embodiments 1 to 4, wherein each of the plurality of first soft magnetic metal particles contains 97 at % or more of Fe in an inner region surrounded by the grain boundary region.

Additional Embodiment 6

The coil component of any one of Additional Embodiments 1 to 5, wherein each of the plurality of first soft magnetic metal particles contains 98 at % or more of Fe in the inner region.

Additional Embodiment 7

The coil component of any one of Additional Embodiments 1 to 6, wherein each of the plurality of first soft magnetic metal particles contains 99 at % or more of Fe in the inner region.

Additional Embodiment 8

The coil component of any one of Additional Embodiments 1 to 7, wherein each of the plurality of soft magnetic metal particles contains no element A in the central region.

Additional Embodiment 9

The coil component of any one of Additional Embodiments 1 to 8, wherein each of the plurality of soft magnetic metal particles contains 0.01 at % to 1.0 at % of Si in the central region.

Additional Embodiment 10

The coil component of any one of Additional Embodiments 1 to 9, wherein the central region contains no Si—O precipitates.

Additional Embodiment 11

The coil component of any one of Additional Embodiments 1 to 10, wherein, of a total number of the plurality of soft magnetic metal particles in a field of view, the plurality of first soft magnetic metal particles accounts for 1% to 10%.

Additional Embodiment 12

The coil component of any one of Additional Embodiments 1 to 11, wherein the oxide film contains an oxide of Fe.

Additional Embodiment 13

The coil component of any one of Additional Embodiments 1 to 12, wherein the plurality of soft magnetic metal particles includes one soft magnetic metal particle and another soft magnetic metal particle adjacent to said one soft magnetic metal particle, wherein said one soft magnetic metal particle and said another soft magnetic metal particle are bonded to each other by the oxide film covering a surface of said one soft magnetic metal particle and the oxide film covering a surface of said another soft magnetic metal particle.

Additional Embodiment 14

The coil component of any one of Additional Embodiments 1 to 13, wherein, for one of the plurality of soft magnetic metal particles, a radial width of the surface region of said one soft magnetic metal particle is equal to or less than 10% of the Heywood diameter of said one soft magnetic metal particle.

Additional Embodiment 15

A circuit board comprising the coil component of any one of Additional Embodiments 1 to 14.

Additional Embodiment 16

An electronic component comprising the circuit board of Additional Embodiment 15.

Additional Embodiment 17

A manufacturing method of a magnetic base body, comprising steps of:

obtaining a molded body from a mixed resin composition, the mixed resin composition being obtained by mixing a resin with a plurality of soft magnetic metal powder particles containing Fe, Si, and an element A (wherein the element A is at least one selected from the group consisting of Cr and Al);

performing a first heating process in which the molded body is heated in a reducing atmosphere at a first temperature; and after the first heating process, performing a second heating process in which the molded body is heated in an oxygen atmosphere containing oxygen to form an oxide film that contains an oxide of Si and an oxide of the element A on a surface of each of the plurality of soft magnetic metal powder particles, and to precipitate Si—O precipitates in surface regions of only some of the plurality of soft magnetic metal powder particles.

Additional Embodiment 18

The method of Additional Embodiment 17, wherein the resin is a pyrolytic resin, and wherein the method further comprising degreasing the molded body in a non-oxygen atmosphere.

Additional Embodiment 19

The method of Additional Embodiment 17 or 18, wherein an atomic proportion of Si contained in the plurality of soft magnetic metal powder particles is higher than a total atomic proportion of the element A contained in the plurality of soft magnetic metal powder particles.

What is claimed is:

1. A coil component, comprising:

a magnetic base body including a plurality of soft magnetic metal particles containing Fe and Si, and an oxide film provided on a surface of each of the plurality of soft magnetic metal particles and containing an oxide of Si and an oxide of element A, wherein the element A is at least one selected from the group consisting of Cr and Al; and a coil conductor provided in the magnetic base body, wherein each of the soft magnetic metal particles is divided into a central region and a surface region situated radially outward from the central region and containing a higher atomic proportion of Si than the central region, and wherein the plurality of soft magnetic metal particles includes a plurality of first soft magnetic metal particles, each of the plurality of first soft magnetic metal particles includes a plurality of Si—O precipitates containing Si and O in the surface region, and the plurality of Si—O precipitates are separated from each other.

2. The coil component of claim 1, wherein the plurality of soft magnetic metal particles includes a plurality of second soft magnetic metal particles, and each of the plurality of second soft magnetic metal particles includes no Si—O precipitates.

3. The coil component of claim 1, wherein at least one of the plurality of first soft magnetic metal particles has a plurality of crystal grains and also contains the Si—O precipitates in a grain boundary region near a grain boundary of the plurality of crystal grains.

4. The coil component of claim 1, wherein each of the plurality of soft magnetic metal particles contains 95 at % or more of Fe in the central region.

5. The coil component of claim 3, wherein each of the plurality of first soft magnetic metal particles contains 97 at % or more of Fe in an inner region surrounded by the grain boundary region.

6. The coil component of claim 5, wherein each of the plurality of first soft magnetic metal particles contains 98 at % or more of Fe in the inner region.

7. The coil component of claim 6, wherein each of the plurality of first soft magnetic metal particles contains 99 at % or more of Fe in the inner region.

8. The coil component of claim 4, wherein each of the plurality of soft magnetic metal particles contains no element A in the central region.

9. The coil component of claim 1, wherein each of the plurality of soft magnetic metal particles contains 0.01 at % to 1.0 at % of Si in the central region.

10. The coil component of claim 1, wherein the central region contains no Si—O precipitates.

11. The coil component of claim 1, wherein, of a total number of the plurality of soft magnetic metal particles in a field of view, the plurality of first soft magnetic metal particles accounts for 1% to 10%.

12. The coil component of claim 1, wherein the oxide film contains an oxide of Fe.

13. The coil component of claim 1, wherein the plurality of soft magnetic metal particles includes one soft magnetic metal particle and another soft magnetic metal particle adjacent to said one soft magnetic metal particle, wherein said one soft magnetic metal particle and said another soft magnetic metal particle are bonded to each other by the oxide film covering a surface of said one soft magnetic metal particle and the oxide film covering a surface of said another soft magnetic metal particle.

14. The coil component of claim 1, wherein, for one of the plurality of soft magnetic metal particles, a radial width of the surface region of said one soft magnetic metal particle is equal to or less than 10% of a Heywood diameter of said one soft magnetic metal particle.

15. A circuit board comprising the coil component of claim 1.

16. An electronic component comprising the circuit board of claim 15.

17. A manufacturing method of a magnetic base body, comprising:

obtaining a molded body from a mixed resin composition, the mixed resin composition being obtained by mixing a resin with a plurality of soft magnetic metal powder particles containing Fe, Si, and an element A, wherein the element A is at least one selected from the group consisting of Cr and Al;

performing a first heating process in which the molded body is heated in a reducing atmosphere at a first temperature; and after the first heating process, performing a second heating process in which the molded body is heated in an oxygen atmosphere containing oxygen to form an oxide film that contains an oxide of Si and an oxide of the element A on a surface of each of the plurality of soft magnetic metal powder particles, and to precipitate Si—O precipitates in surface regions of only some of the plurality of soft magnetic metal powder particles.

18. The method of claim 17, wherein the resin is a pyrolytic resin, and the method further comprising degreasing the molded body in a non-oxygen atmosphere.

19. The method of claim 17, wherein an atomic proportion of Si contained in the plurality of soft magnetic metal powder particles is higher than a total atomic proportion of the element A contained in the plurality of soft magnetic metal powder particles.

* * * * *